United States Patent
Yamamoto et al.

(10) Patent No.: US 11,502,575 B2
(45) Date of Patent: Nov. 15, 2022

(54) MOTOR AND AIR-CONDITIONING APPARATUS

(71) Applicant: Mitsubishi Electric Corporation, Tokyo (JP)

(72) Inventors: Mineo Yamamoto, Tokyo (JP); Hiroyuki Ishii, Tokyo (JP); Junichiro Oya, Tokyo (JP); Yuto Urabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 127 days.

(21) Appl. No.: 16/767,635

(22) PCT Filed: Jan. 18, 2018

(86) PCT No.: PCT/JP2018/001392
§ 371 (c)(1),
(2) Date: May 28, 2020

(87) PCT Pub. No.: WO2019/142289
PCT Pub. Date: Jul. 25, 2019

(65) Prior Publication Data
US 2020/0373795 A1    Nov. 26, 2020

(51) Int. Cl.
*H02K 3/50* (2006.01)
*H02K 5/22* (2006.01)
(Continued)

(52) U.S. Cl.
CPC .............. *H02K 5/225* (2013.01); *H02K 1/165* (2013.01); *H02K 3/12* (2013.01); *H02K 3/345* (2013.01);
(Continued)

(58) Field of Classification Search
CPC .......... H02K 1/165; H02K 3/38; H02K 3/345; H02K 3/34; H02K 1/187; H02K 3/522;
(Continued)

(56) References Cited

U.S. PATENT DOCUMENTS

| 2011/0234031 A1* | 9/2011 | Kato | H02K 3/522 |
| | | | 310/71 |
| 2013/0257183 A1* | 10/2013 | Yokogawa | H02K 5/02 |
| | | | 310/43 |

(Continued)

FOREIGN PATENT DOCUMENTS

| JP | H06-178484 A | 6/1994 |
| JP | H08-107661 A | 4/1996 |

(Continued)

OTHER PUBLICATIONS

Yamamoto et al, Molded Stator, Pump, Water Heater, Electric Motor, and Method of Manufacturing Pumps, Feb. 4, 2010, JP 2010028909 (English Machine Translation) (Year: 2010).*

(Continued)

*Primary Examiner* — Alexander A Singh
(74) *Attorney, Agent, or Firm* — Posz Law Group, PLC

(57) ABSTRACT

A motor includes a stator to which a substrate can be stably secured without increasing the size of the substrate. An air-conditioning apparatus includes the motor. At an end portion of the stator in the axial direction thereof, a substrate on which electronic components are mounted is provided. The stator includes: a stator core formed by stacking electromagnetic steel sheets, and including a plurality of teeth; insulators provided on the stator core; and a wire wound around the teeth, the teeth being coated with the insulators. The insulators have outer walls provided on respective core backs of the stator core. In a linearly developed state of the stator, where of the teeth, an outermost tooth is a first tooth, a tooth adjacent to the first tooth is a second tooth, another (Continued)

tooth adjacent to the second tooth is a third tooth, another tooth adjacent to the third tooth is a fourth tooth, and another tooth adjacent to the fourth tooth is a fifth tooth, the outer walls of the first, third and fifth teeth include respective substrate attachment pins for use in attachment of the substrate, and the outer walls of the first tooth include respective power terminals for use in supplying power to the wire.

7 Claims, 18 Drawing Sheets

(51) Int. Cl.
    *H02K 1/16*         (2006.01)
    *H02K 3/12*         (2006.01)
    *H02K 3/48*         (2006.01)
    *H02K 3/34*         (2006.01)
    *F25B 31/02*       (2006.01)

(52) U.S. Cl.
    CPC ................. *H02K 3/48* (2013.01); *H02K 3/50* (2013.01); *F25B 31/02* (2013.01)

(58) Field of Classification Search
    CPC ............ H02K 3/50; H02K 3/28; H02K 5/225; H02K 1/148; H02K 3/48; H02K 5/08; H02K 3/12; H02K 2203/03; H02K 2211/03; H02K 5/22; F25B 31/02
    USPC .......................................... 310/214, 215, 71
    See application file for complete search history.

(56) References Cited

U.S. PATENT DOCUMENTS

| | | | |
|---|---|---|---|
| 2014/0327336 A1* | 11/2014 | Ewert | .................... H02K 3/522 |
| | | | 310/215 |
| 2018/0212480 A1* | 7/2018 | Aso | ........................ H02K 1/185 |

FOREIGN PATENT DOCUMENTS

| | | | |
|---|---|---|---|
| JP | 2010-028909 A | | 2/2010 |
| JP | 2010028909 A | * | 2/2010 |
| JP | 2012-100421 A | | 5/2012 |

OTHER PUBLICATIONS

International Search Report of the International Searching Authority dated Apr. 17, 2018 in corresponding International Patent Application No. PCT/JP2018/001392 (and English translation).

Office Action dated Jan. 4, 2022 issued in corresponding CN patent application No. 201880085658.3 (and English translation).

Office Action dated May 16, 2022 issued in corresponding CN patent application No. 201880085658.3 (and English Translation).

* cited by examiner

MOTOR AND AIR-CONDITIONING APPARATUS

CROSS REFERENCE TO RELATED APPLICATION

This application is a U.S. national stage application of PCT/JP2018/001392 filed on Jan. 18, 2018, the contents of which are incorporated herein by reference.

TECHNICAL FIELD

The present disclosure relates to a motor, and particularly relates to a structure of a stator and an air-conditioning apparatus provided with the motor.

BACKGROUND ART

In existing motors, at an end portion of a stator in the axial direction thereof, a substrate is provided on which electronic components are mounted. The stator includes a stator core and insulators with which the stator core is coated, and the stator core is formed by stacking a predetermined number of electromagnetic steel sheets formed into a predetermined shape, and includes a plurality of teeth. A wire is wound around each of the teeth of the stator, which are coated with the insulators, to thereby form coils. The substrate is secured to one end face of the stator in the axial direction (see, e.g., Patent Literatures 1 to 3). The substrate is connected to power terminals protruding from the stator, secured to substrate attachment pins provided at the stator, and formed integral with the stator. Of outer walls of the insulators which are provided on the teeth of the stator, outer walls having power terminals and outer walls of the insulators on teeth close thereto have substrate attachment pins, which are used to secure the edge portion of the substrate (see, e.g., Patent Literature 3).

CITATION LIST

Patent Literature

Patent Literature 1: Japanese Unexamined Patent Application Publication No. 08-107661
Patent Literature 2: Japanese Unexamined Patent Application Publication No. 06-178484
Patent Literature 3: Japanese Unexamined Patent Application Publication No. 2012-100421

SUMMARY OF INVENTION

Technical Problem

In the motors disclosed in Patent Literatures 1 and 2, a substrate having substantially the same outer size as the stator is attached to one end portion of the stator. In this case, when the stator is molded out of resin, the substrate is supported by pins provided at a die and an end face of the stator. Therefore, the stator is molded out of resin while stably holding the substrate. However, the outer size of the substrate is large, and the cost of the substrate is thus high.

In the motor disclosed in Patent Literature 3, the outer size of the substrate is smaller than those of the motors of Patent Literature 1 and Patent Literature 2. However, in order that the inside and outside diameters of the stator core 1 be increased to the greatest possible values and the efficiency of the motor be also increased to the highest possible value, without enlarging the outer shell of the motor, the positions of the substrate attachment pins provided at the stator are shifted toward the outer periphery of the stator. Therefore, the larger the stator, the larger an outer peripheral portion of the substrate.

That is, when an existing stator is in a linearly developed state, power terminals are provided at outer walls of three teeth from an outermost tooth to the third tooth from the outermost tooth. A single substrate attachment pin is provided at the outer wall of the outermost tooth, and remaining two substrate attachment pints that secure the substrate are provided at outer walls of teeth where power terminals are not provided. Therefore, as the outside diameters of the stator core are increased, the distance between adjacent substrate attachment pins is also increased, and the outer size of the substrate to be attached is also increased. Thus, the cost of the substrate is increased, through a circuit mounted on the substrate remains unchanged.

The present disclosure relates to a motor including a stator to which a substrate can be stably secured without increasing the size of the substrate, and also provide an air-conditioning apparatus including the motor.

Solution to Problem

A motor according to an embodiment of the present disclosure includes a stator where a substrate on which electronic components are mounted is provided, the substrate being located at an end portion of the stator in an axial direction of the stator. The stator includes: a stator core formed by stacking electromagnetic steel sheets, and including a plurality of teeth, insulators provided on the stator core, and a wire wound around the teeth, the teeth being coated with the insulators. The insulators with which the teeth are coated have outer walls provided on respective core backs of the stator core. In a linearly developed state of the stator, where an outermost one of the teeth is a first tooth, one of the teeth that is adjacent to the first tooth is a second tooth, another one of the teeth that is adjacent to the second tooth is a third tooth, another one of the teeth that is adjacent to the third tooth is a fourth tooth, and another one of the teeth that is adjacent to the fourth tooth is a fifth tooth, the outer walls of the first tooth, the third tooth, and the fifth tooth include respective substrate attachment pins for use in attachment of the substrate, and the outer walls of the first tooth and the third tooth include respective power terminals for use in supplying power to the wire.

Advantageous Effects of Invention

In the embodiment of the present disclosure, since the outer size of the substrate does not need to be increased even in the case where the outside diameter of the stator is increased, the cost of the substrate can be reduced. Also, the substrate attachment pins are located so as not to interfere with drawing or routing of a wire between teeth, and routing and winding of the wire can thus be performed as in existing motors.

DESCRIPTION OF EMBODIMENTS

Embodiment 1

Figure 1:
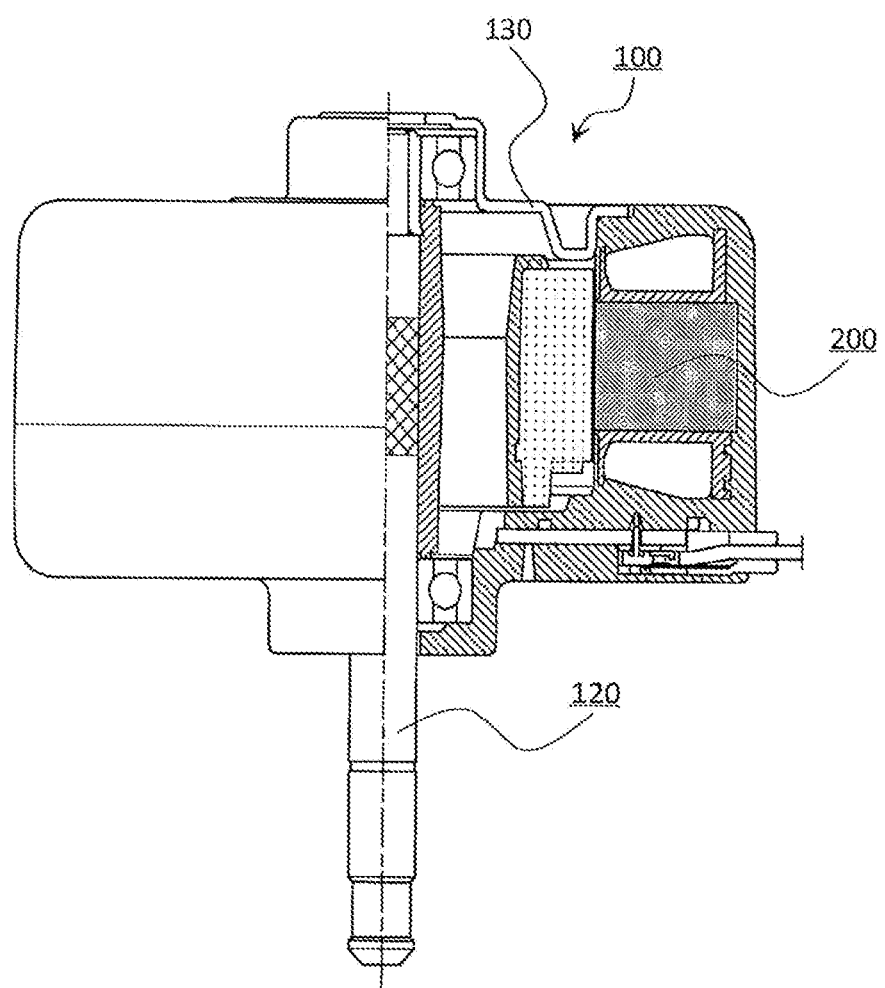
FIG. 1 is a sectional view of a motor according to Embodiment 1.

FIG. 1 is a sectional view of a motor 100 according to Embodiment 1. As illustrated in FIG. 1, the motor 100 includes a mold stator 200, a rotor 120, and a metal bracket 130 attached to one end portion of the mold stator 200 in an axial direction thereof (or on an opening side).

The motor 100 is, for example, a brushless DC motor that includes a permanent magnet in the rotor 120 and that is driven by an inverter.

Figure 2:
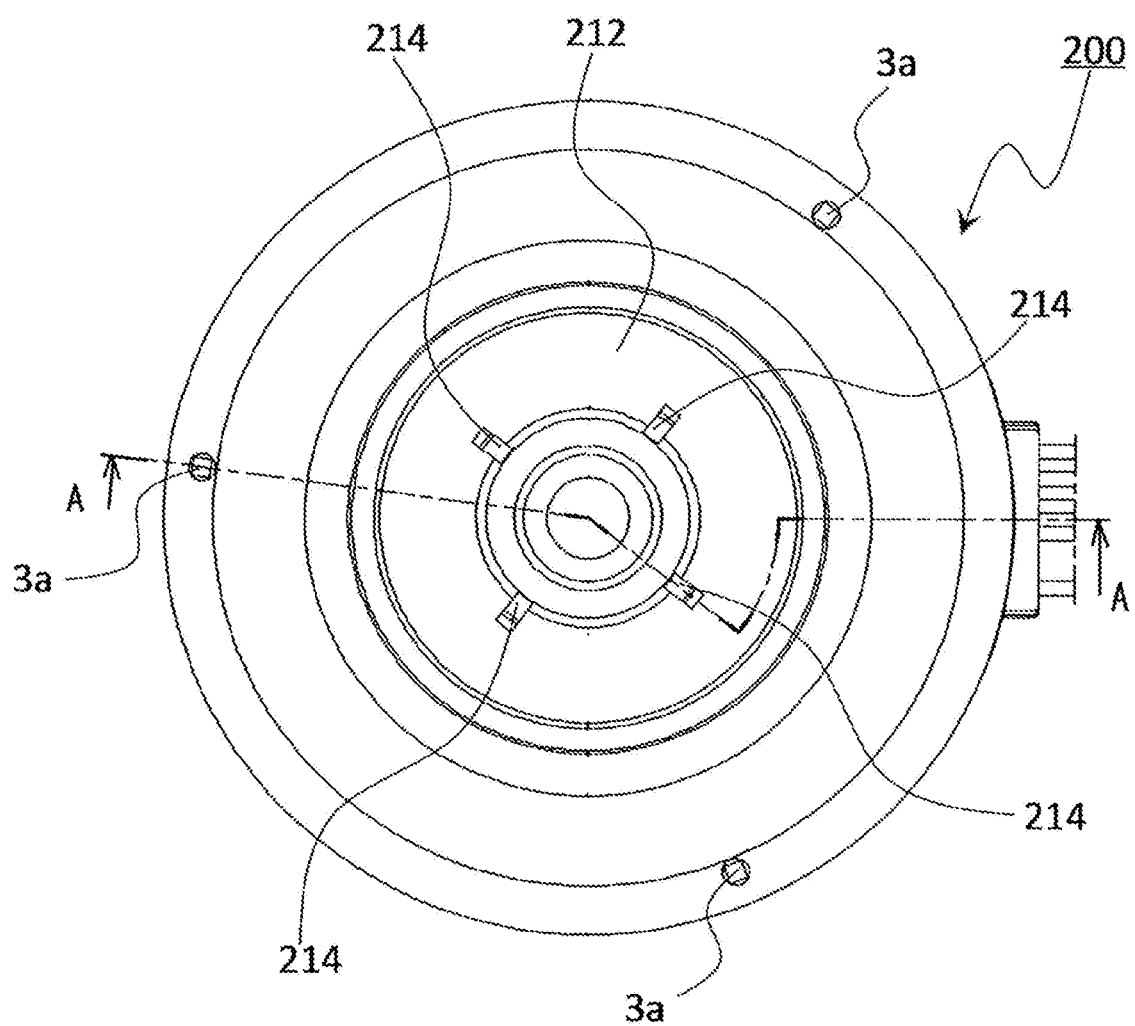
FIG. 2 is a plan view of a mold stator according to Embodiment 1.
Figure 3:
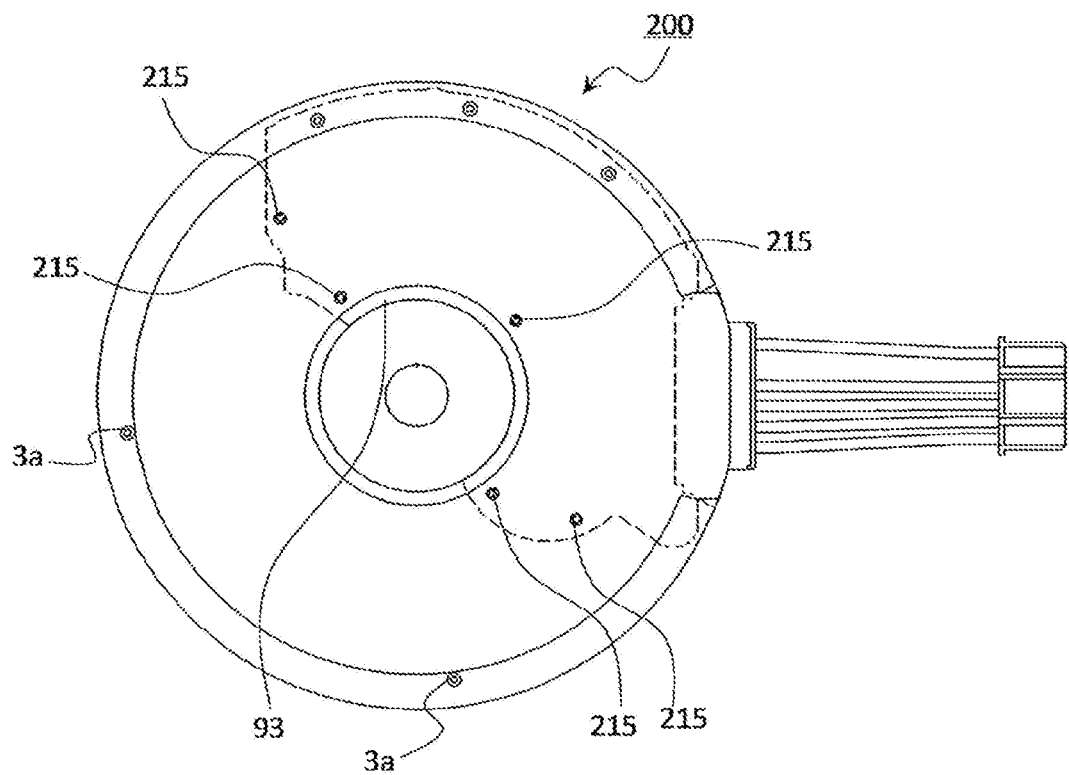
FIG. 3 is a plan view of an end face of the mold stator that is located on the opposite side of a side of the mold stator that is illustrated in FIG. 2.
Figure 4:
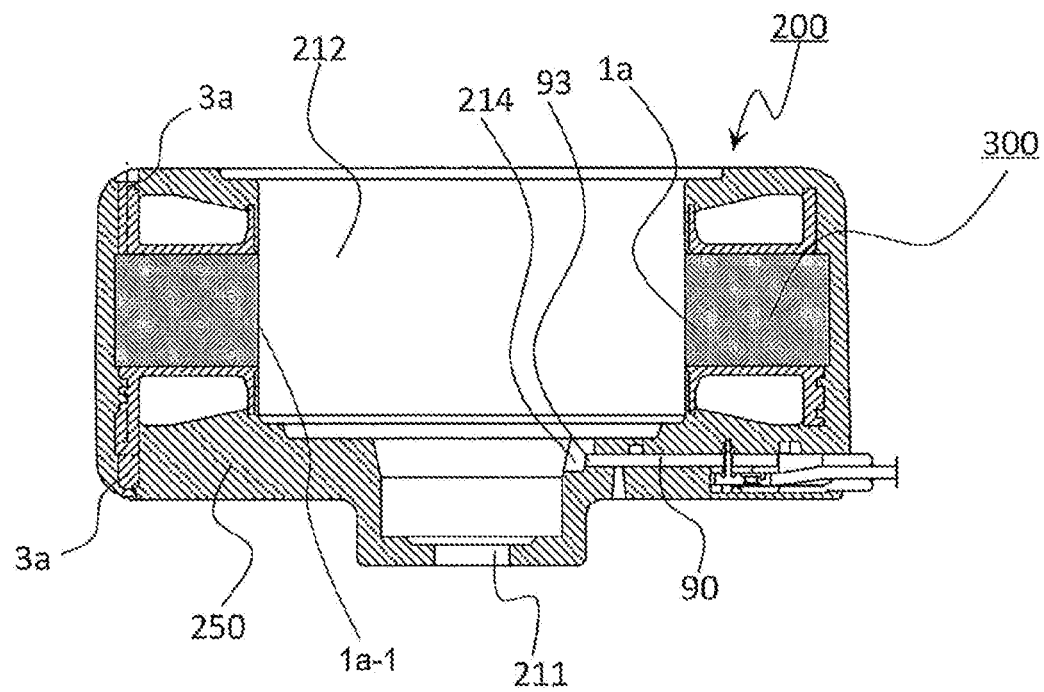
FIG. 4 is an explanatory diagram of an internal structure of the mold stator as illustrated in FIGS. 2 and 3.

FIG. 2 is a plan view of the mold stator 200 according to Embodiment 1. FIG. 3 is a plan view of an end face of the mold stator 200 that is located on an opposite side of the side illustrated in FIG. 2. FIG. 4 is an explanatory diagram of an internal structure of the mold stator 200 as illustrated in FIGS. 2 and 3. FIG. 4 illustrates a section taken along line A-A in FIG. 2.

The mold stator 200 is formed by integrally molding a stator assembly 300, which will be described below, out of molding resin 250 (thermosetting resin). The mold stator 200 is open at the above end portion in the axial direction (on the upper side in FIG. 4), and has a cavity 212 into which the rotor 120 is inserted.

The mold stator 200 has a hole 211 at the other end portion (the lower side in FIG. 4) of the mold stator 200 in the axial direction. The hole 211 is slightly larger in diameter than a shaft 123 of the rotor 120.

Preferably, the mold stator 200 should be formed by low-pressure molding, because the mold stator 200 includes a substrate 90 (which will be described later) provided at the mold stator 200, and is integrally molded with the stator assembly 300 (which will be described later) that includes components having a low strength. Thus, a thermosetting resin such as unsaturated polyester resin is used as molding resin.

Positioning of the mold stator 200 in the axial direction at the time of molding the mold stator 200 out of the molding resin 250 (thermosetting resin) is achieved by pressing, with upper and lower dies, a plurality of die holding members 3a of insulators 3 provided close to an outer periphery of a stator 400. Also, positioning of the mold stator 200 in the radial direction is achieved by fitting an inner periphery of a stator core 1 to a die core-bar portion. Therefore, end portions 1a-1 of teeth 1a of the stator core 1 are exposed to space at the inner periphery of the mold stator 200. The insulators 3 of the stator 400 and the stator core 1 will be described below.

The substrate 90 is secured to the stator 400. However, the substrate 90 may be deformed by a molding pressure, and is thus held by a plurality of substrate retaining protrusions (not illustrated) at an upper die for use in molding the molding resin 250. Thus, even if the substrate 90 is deformed, such deformation is reduced. Therefore, a plurality of recesses 215 are exposed at the end face of the mold stator 200 that is close to the substrate 90 in the axial direction. Furthermore, the substrate 90 may be displaced in the radial direction. Thus, substrate positioning protrusions (not illustrated) are provided at the die core-bar portion to which the inner periphery of the stator core 1 is fitted, and an arc 93 of an edge portion 95 on the inner peripheral side of the substrate 90, which is illustrated FIGS. 3 and 4, is fitted to the substrate positioning protrusions, to thereby reduce the displacement of the substrate 90 in the radial direction. Thus, the substrate 90 held by the substrate positioning protrusions is partially exposed to a U-shaped portion 214 of the cavity 212 in the mold stator 200 as illustrated in FIG. 4. It should be noted that in Embodiment 1, four substrate positioning protrusions are arranged at intervals of substantially 90 degrees. Thus, the substrate positioning protrusions are reliably fitted at three points to the arc 93 at the inner peripheral side of the substrate 90, which is an arc whose measure is greater than 180 degrees, in Embodiment 1. Accordingly, the substrate 90 is stably positioned in the radial direction and a high quality of the mold stator 200 is ensured. Also, the substrate positioning protrusions are fitted at four points to the arc 93 at the inner peripheral side of the substrate 90. Thus, since the substrate 90 is stably positioned in the radial direction, the high quality of the mold stator 200 is ensured.

Figure 5:
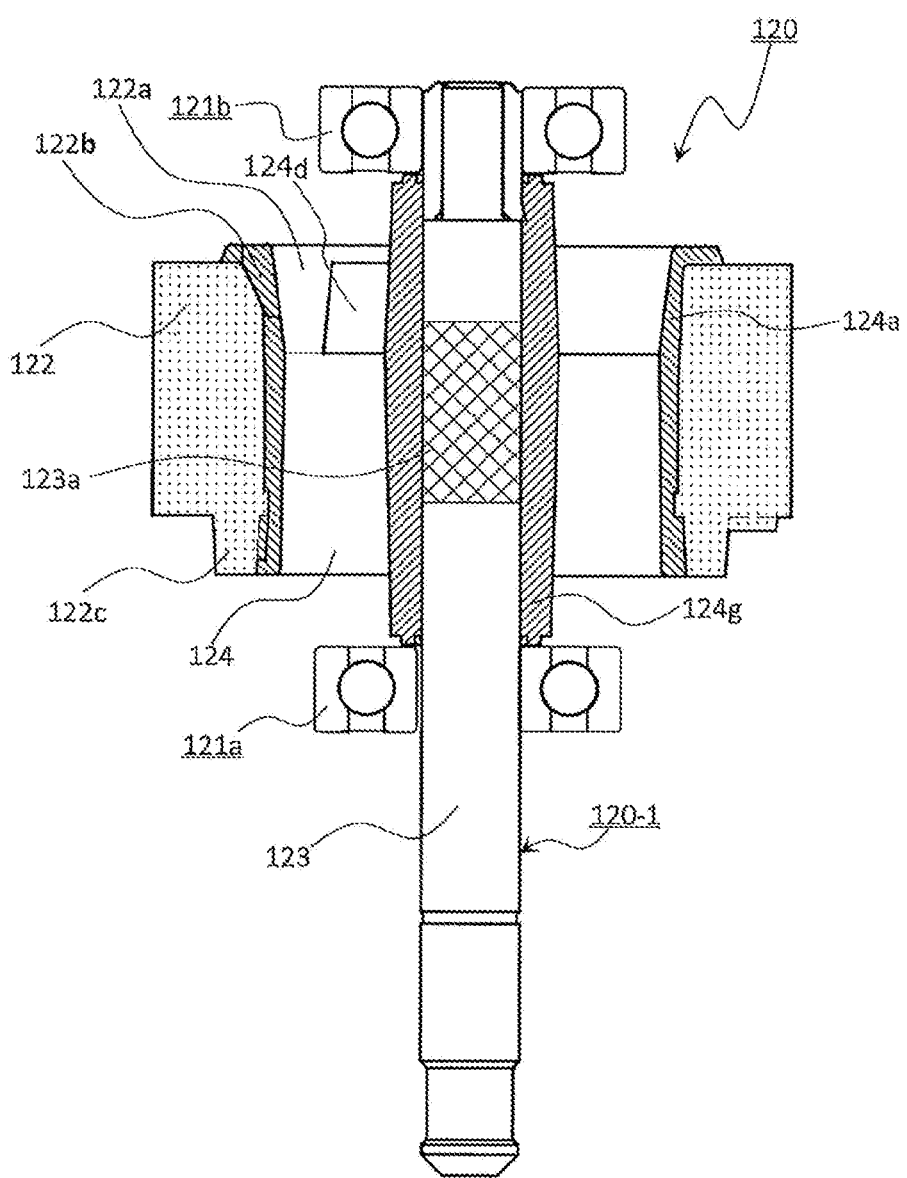
FIG. 5 is an explanatory diagram illustrating a sectional structure of a rotor according to Embodiment 1.

FIG. 5 is an explanatory diagram illustrating a sectional structure of the rotor 120 according to Embodiment 1. The rotor 120 includes a rotor resin assembly 120-1, a load-side rolling bearing 121a, and an anti-load-side rolling bearing 121b.

The rotor resin assembly 120-1 includes the shaft 123 that is formed to have a knurled portion 123a, a ring-shaped rotor magnet 122 of the rotor 120, and a resin portion 124 that combines the shaft 123 and the rotor magnet 122. The rotor resin assembly 120-1 as illustrated in FIG. 5 is merely an example; that is, the rotor resin assembly 120-1 is not limited to that as illustrated in FIG. 5.

Figure 6:
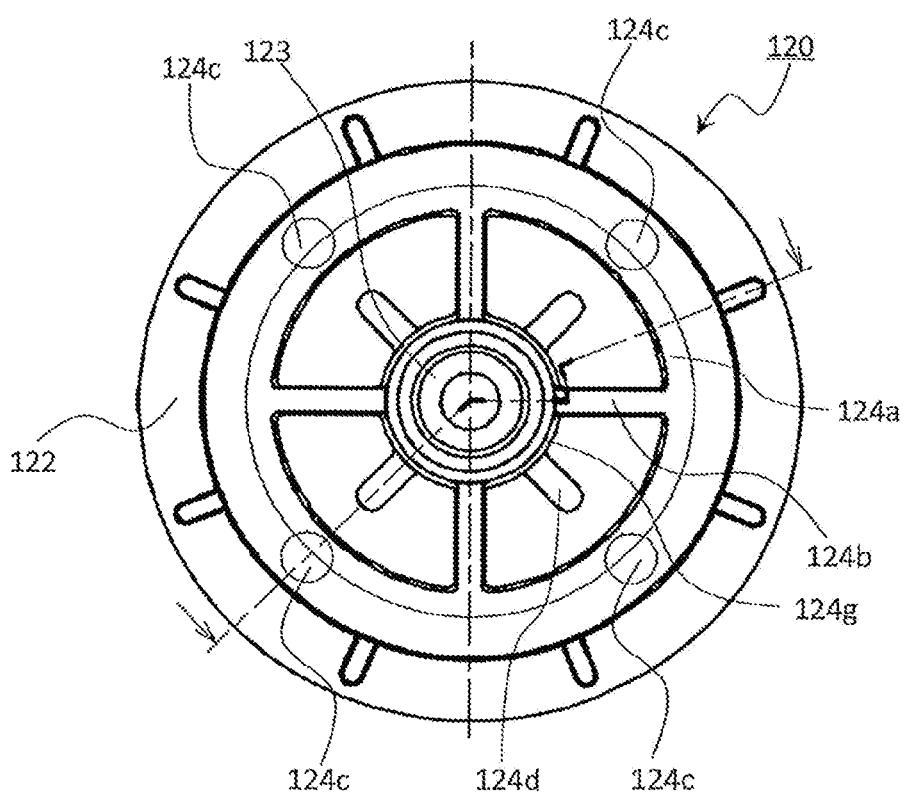
FIG. 6 is a plan view of a rotor resin assembly according to Embodiment 1.

FIG. 6 is a plan view of the rotor resin assembly 120-1 according to Embodiment 1. The rotor resin assembly 120-1 is obtained by integrating the annular rotor magnet 122 and the shaft 123 with the resin portion 124 that is formed by injection from a vertical molding machine. The resin portion 124 has a plurality of ribs 124*j* that are formed to radially extend from the shaft 123 and also extend in the axial direction. The ribs 124*j* connect a cylindrical portion 124*g* formed on an outer periphery of the shaft 123 and a cylindrical portion 124*a* formed immediately inward of the rotor magnet 122. A hollow portion 124*k* extending in the axial direction is formed between any adjacent two of the ribs 124*j*.

The anti-load-side rolling bearing 121*b* is attached to the anti-load side (the upper side in FIG. 5) of the shaft 123. Generally, the load-side rolling bearing 121*a* and the anti-load-side rolling bearing 121*b* are attached to the shaft 123 by press-fitting. The load-side rolling bearing 121*a* is attached to a load side (the lower side in FIG. 5) of the shaft 123 to which a fan, etc., are attached. The load-side rolling bearing 121*a* and the anti-load-side rolling bearing 121*b* are, for example, rolling bearings.

Figure 7:
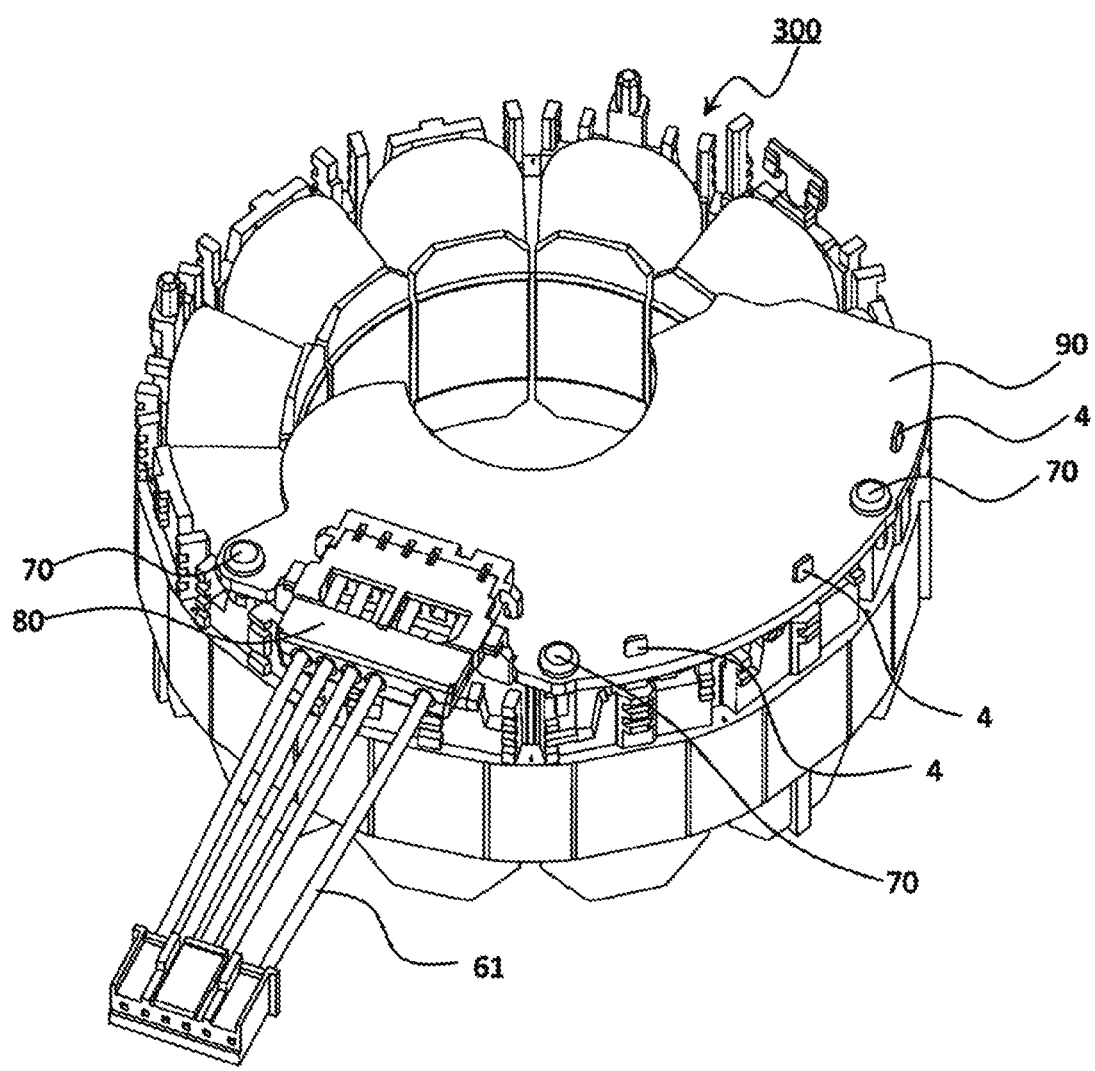
FIG. 7 is a perspective view of a stator assembly of the motor according to Embodiment 1, where a substrate is located.

FIG. 7 is a perspective view of a side the stator assembly 300 of the motor 100 according to Embodiment 1, where the substrate 90 is located. As illustrated in FIG. 7, leads 61 to which a lead leading component 80 is attached are soldered to the substrate 90 on which electric components are mounted. The substrate 90 is attached to the stator 400 by three substrate attachment pins 70 to form the stator assembly 300. Referring to FIG. 7, three power terminals 4 penetrate the substrate 90 to protrude outwardly from the substrate 90. The power terminals 4 are each used in supplying power to a magnet wire 2, which is a winding at the stator 400. A single neutral terminal 5 is inserted into an outer wall 71 of a connection-side insulator 3*b*. It should be noted that of the insulators 3 provided on the stator core 1, insulators that are applied to a side to which the substrate is attached and that are located outward of one end face of the stator core 1 are referred to as the connection-side insulators 3*b*, and insulators located outward of the other end face of the stator core 1 will be referred to as anti-connection-side insulators 3*c*.

Figure 8:
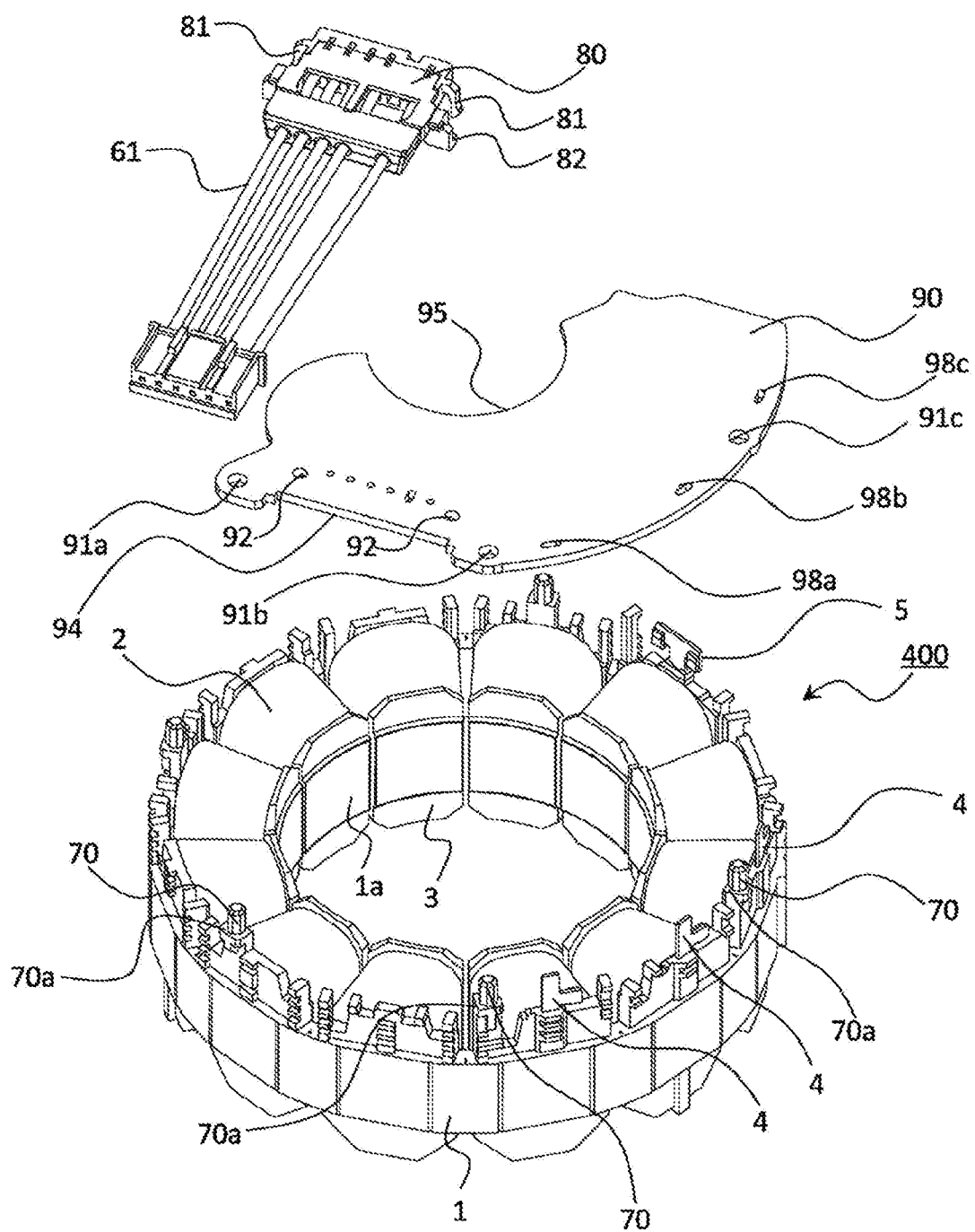
FIG. 8 is a perspective view of states of the substrate and the stator of the motor according to Embodiment 1 that are located immediately before the substrate is attached to the stator.

FIG. 8 is a perspective view illustrating states of the substrate 90 and the stator 400 of the motor 100 according to Embodiment 1 that are located immediately before the substrate 90 is attached to the stator 400. As illustrated in FIG. 8, the stator 400 and the substrate 90 are positioned such that the substrate attachment pins 70 and the power terminals 4 in the outer walls 71 of the connection-side insulators 3*b* of the stator 400 can be inserted into respective ones of stator mounting holes 91 and terminal holes 98 in the substrate 90.

The substrate 90 is mounted on substrate mounting faces 70*a* of the substrate attachment pins 70, the substrate attachment pins 70 that protrude from the substrate 90 are thermally fused and deformed, and the substrate 90 is fixed to the stator 400.

Between two power terminals 4 (on the right side in FIG. 8), one substrate attachment pin 70 is provided, and on both sides of the lead leading component 80, two substrate attachment pins 70 are provided. Thus, on these three points, the substrate 90 are fixed to the stator 400. It is therefore possible to ensure reliable attachment of the substrate 90.

The configuration of the stator 400 will be described with reference to FIG. 8. The stator 400 as illustrated in FIG. 8 is a stator for use in the motor 100 that includes 12 slots and 8 poles. The stator 400 of the motor 100 has the following features.

(1) The stator core 1 includes 12 slots (the stator core 1 includes 12 teeth 1*a*).

(2) The winding, that is, the wire, is a single three-phase Y connection, and has 8 poles. The wire is of a concentrated winding type and is wound each of the 12 teeth 1*a*.

(3) The stator core 1 is formed in the following manner: electromagnetic steel sheets each having a thickness of approximately 0.1 to 0.7 mm are stamped to obtain pieces formed in the shape of a belt, these pieces are caulked, and stacked, for example, by welding or bonding. The stator core 1 (that will be described later) formed in such a manner is belt-shaped, and includes 12 teeth 1*a*.

(4) The belt-shaped stator core 1 are coated with the insulators 3 to insulate the wire and the stator core 1 from each other. For example, the insulators 3 may be integrally molded with the stator core 1 and out of thermoplastic resin such as polybutylene terephthalate (PBT). The insulators 3 may be provided on the teeth 1*a* after molded. In this case, each of the insulators 3 is divided into a connection side and an anti-connection side, and the connection side and anti-connection side of the insulator 3 are inserted from both ends of an associated tooth 1*a* in the axial direction. The insulators 3 are provided on the respective teeth 1*a*. Therefore, in this case, twelve insulators 3 are provided.

(5) After the belt-shaped stator core 1 is coated with the insulators 3, three power terminals 4 and one neutral terminal 5 are inserted at predetermined portions of each of the connection-side insulators 3*b*.

(6) Winding of a wire of the first phase and the second phase is continuously carried out. That is, jumper wires 2*a* and 2*b* are not cut.

(7) Winding of a wire of the third phase is carried out. To be more specific, a coil is formed with a magnet wire 2 of the third phase, which is different from that of the first and second phases.

(8) After the winding of the wires, the stator core 1 is bent such that the teeth 1*a* are located on an inner side of the stator core 1. The stator core 1 is bent in a predetermined direction into a substantially doughnut shape.

(9) Stator-core butt portions 1*d* of the stator core 1 are welded and secured.

Figure 9:
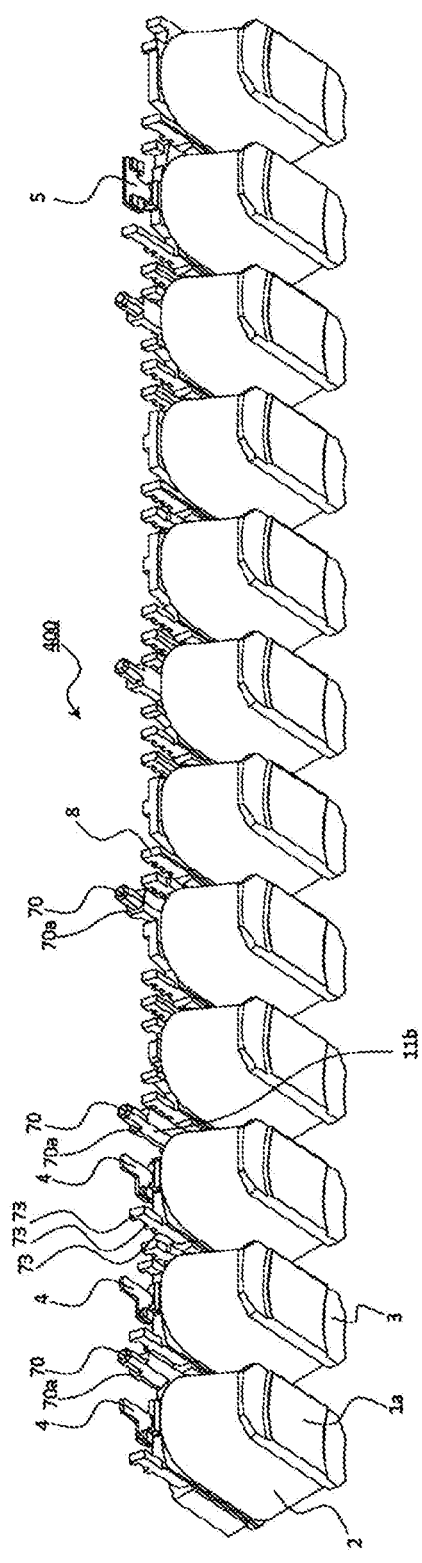
FIG. 9 is a perspective view of a developed state of the stator as illustrated in FIG. 8.

FIG. 9 is a perspective view of a developed state of the stator 400 as illustrated in FIG. 8. In the stator 400 as illustrated in FIG. 9, winding is completed, with the stator core 1 linearly developed. FIG. 9 illustrates the stator 400 as viewed from a side that is located obliquely above the connection side. It should be noted that start and end points of winding of the magnet wire 2*t*, which is used as the winding, and jumper wires, etc., are not illustrated.

Three power terminals 4 are inserted into respective outer walls 71 of the connection-side insulators 3*b* molded integrally with the stator core 1, that is, inserted at a predetermined point on the upper side of FIG. 9.

One neutral terminal 5 is also inserted into the outer wall 71 of the connection-side insulator 3*b* molded integrally with the stator core 1, that is, one neutral terminal 5 is inserted at a predetermined point on the upper side of FIG. 9.

Furthermore, the outer walls 71 of the connection-side insulators 3*b* have protrusions 8 that hold the jumper wires of different phases at predetermined height positions from the end face of the stator core 1 in the axial direction.

Figure 10:
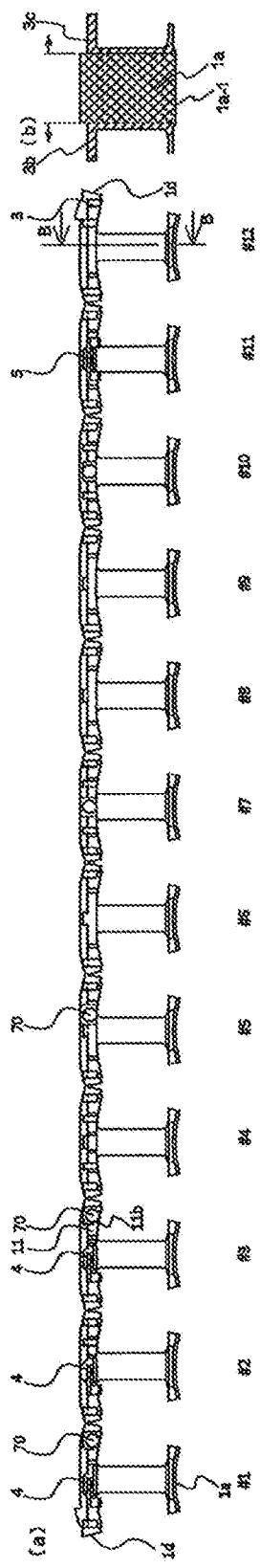
FIG. 10 is a plan view illustrating a state of a stator core of the stator as illustrated in FIG. 9, on which insulators are provided and to which terminals are attached.

FIG. 10 is a plan view illustrating a state of the stator core 1 of the stator 400 as illustrated in FIG. 9, on which the insulators 3 are provided and to which the terminals are attached. As illustrated in FIG. 10, the insulators 3 are integrally molded with the belt-shaped stator core 1. However, it is not indispensable that the insulators 3 are integrally molded with the stator core 1. For example, insulators 3 of other components may be inserted into the teeth 1a from both sides of each of the teeth 1a in the axial direction. FIG. 10, (b), illustrates a section of each of the teeth 1a as illustrated in FIG. 10, (a). To be more specific, FIG. 10, (b), illustrates by way of example a section taken along line B-B in FIG. 10, (a).

In the belt-shaped stator core 1 with which the insulators 3 are integrally molded, the three power terminals 4 and the one neutral terminal 5 are attached to the connection-side insulators 3b. The positions of the three power terminals 4 and the one neutral terminal 5 will be described in detail later. Referring to FIG. 10, the three power terminals 4 are provided at the connection-side insulators 3b of the first to third teeth 1a from the left, and the one neutral terminal 5 is provided at the outer wall 71 of the connection-side insulator 3b of the second tooth 1a from the right. The tooth 1a at the stator core 1 that is located at the leftmost end of the stator 400 in the developed state as illustrated in FIG. 10 will be referred to as a first tooth, the tooth 1a rightward adjacent to the first tooth will be referred to as a second tooth, and the tooth 1a rightward adjacent to the second tooth will be referred to as a third tooth. The teeth 1a are thus sequentially numbered and named in the above manner. Referring to FIG. 10, the teeth 1a are labeled "#1" to "#12" as indicated on the lower side of FIG. 10. In subsequent figures, as appropriate, the teeth 1a are labeled in the same manner as in FIG. 10. In the following description, "N-th tooth 1a" means the N-th tooth 1a from the left of the stator 400 in the developed state, as in FIG. 10.

Figure 11:
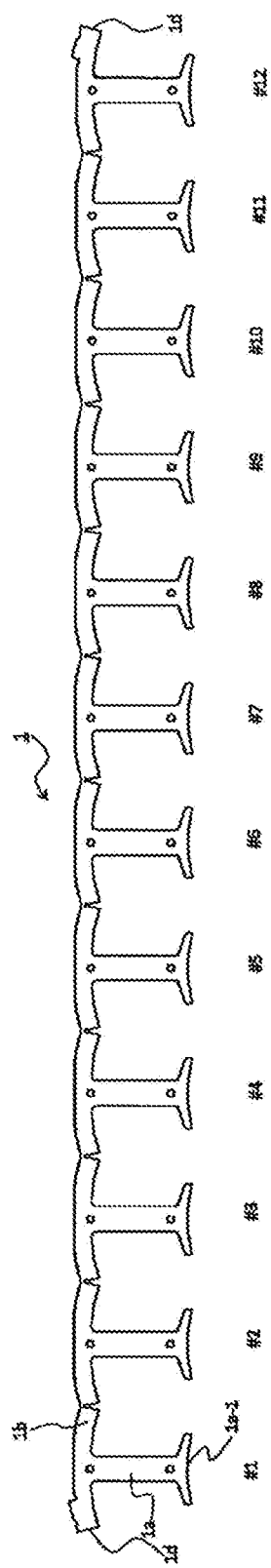
FIG. 11 is a plan view of the stator core (shaped in the form of a belt) of the stator according to Embodiment 1.

FIG. 11 is a plan view of the stator core 1 (shaped in the form of a belt) of the stator 400 according to Embodiment 1. The configuration of the belt-shaped stator core 1 will be described with reference to FIG. 11. The stator 400 of the motor 100 according to Embodiment 1 has 12 slots, and thus has 12 teeth 1a.

The belt-shaped stator core 1 is formed as follows: electromagnetic steel sheets each having approximately 0.1 to 0.7 mm are stamped to obtain pieces formed in the shape of a belt, and the pieces are caulked, and stacked, for example, by welding or bonding.

The teeth 1a are each substantially T-shaped as viewed in plan view. The teeth 1a extend from respective core backs 1b in a direction substantially perpendicular to the core backs 1b.

End portions 1a-1 of the teeth 1a (that are located opposite to the core backs 1b) are substantially rectangular as viewed in front view. The end portions 1a-1 of the teeth 1a are still exposed after the insulators 3 are molded integrally with the stator core 1. In the motor 100, the gap between the rotor 120 and the stator 400 in the radial direction needs to be 1 mm or less. Therefore, the insulators 3 are not provided inward of the cylindrical surface formed by the end portions 1a-1 of the teeth 1a.

Any adjacent two of the teeth 1a are connected at associated core backs 1b by a thin connecting portion 1c. Therefore, the belt-shaped stator core 1 can be reversely bent in a direction parallel to the plane of FIG. 11, that is, the belt-shaped stator core 1 can be bent toward the core backs 1b, or the belt-shaped stator core 1 can be forwardly bent, that is, the belt-shaped stator core 1 can be bent toward the ends of the teeth 1a. That is, the belt-shaped stator core 1 can be flexibly bent in the above manner.

Both ends of the stator 400 as illustrated in FIG. 10 and both ends of the stator core 1 as illustrated in FIG. 11 are the stator-core butt portions 1d. The stator-core butt portions 1d, which are the outer end faces of the core backs 1b of the teeth 1a at both ends of the belt-shaped stator core 1, are brought into contact with each other, when the stator core 1 is forwardly bent such that the teeth 1a are located on the inner side of the stator core 1, welded, and secured.

Figure 12:
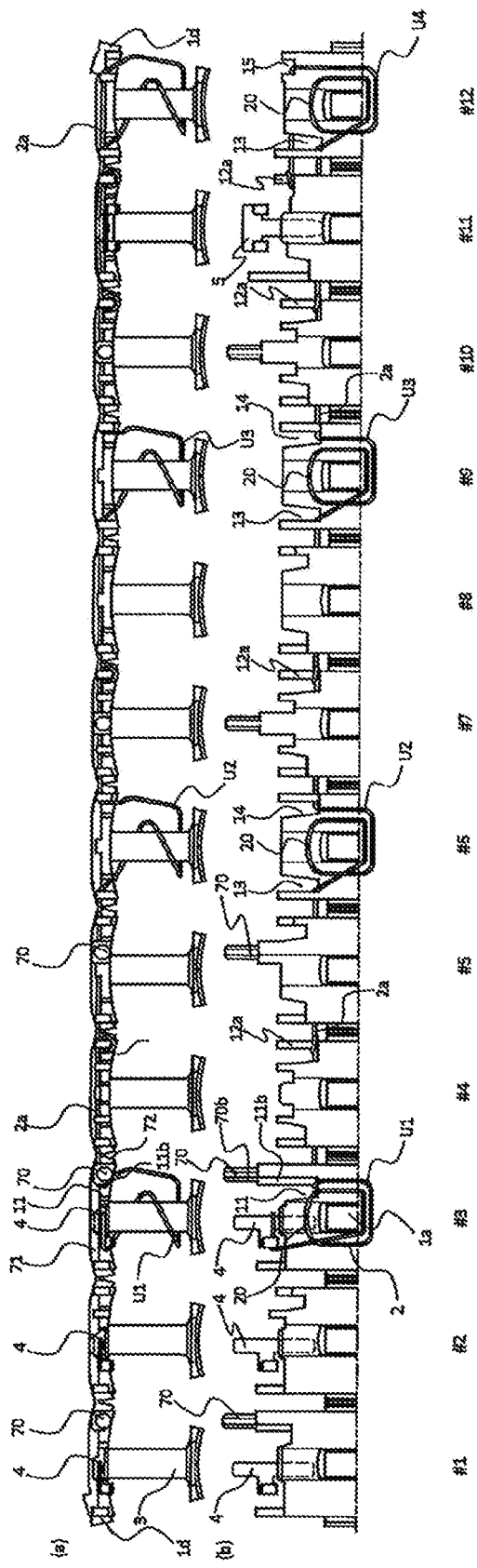
FIG. 12 is a diagram illustrating how a magnet wire of a first phase in the stator of the motor according to Embodiment 1 is routed and wound.

FIG. 12 is a diagram illustrating how the magnet wire of the first phase in the stator 400 of the motor 100 according to Embodiment 1 is routed and wound. With reference to the diagram of FIG. 12, the connection of the stator winding for the first phase will be described. The stator 400 includes coils of the first, second, and third phases. The first phase will be referred to as U-phase, the second phase will be referred to as V-phase, and the third phase will be referred to as W-phase.

For the first phase, a first coil U1 is formed at the third tooth 1a from the left. The wire of the first phase is hooked to a hook of the power terminal 4 attached to the outer wall 71 of the connection-side insulator 3b of the third tooth 1a from the left. The power terminal 4 attached to the outer wall 71 of the connection-side insulator 3b of the third tooth 1a from the left is located close to the center of the tooth 1a.

The first coil U1 of the first phase is formed by winding a magnet wire 2 around the insulator 3 provided at the third tooth 1a, in a counterclockwise direction a predetermined number of times. After the coil U1 is formed, the magnet wire 2 is not cut and is drawn out through an exit opening portion 11 in the outer wall 71 of an associated connection-side insulator 3b, and is drawn to the outside of the outer wall 71. The outer wall 71 of the connection-side insulator 3b has the exit opening portion 11 on a distal end side of the tooth 1a, that is, referring to in FIG. 12, (b), the outer wall 71 has the exit opening portion 11 on the right side of the power terminal 4. At the right of the exit opening portion 11, a substrate attachment pin 70 that is formed in the shape of an octagonal prism and is to be fitted in an associated stator mounting hole 91 in the substrate 90 is provided. The substrate attachment pin 70 is located close to the inner surface of the outer wall 71 of an associated insulator 3 and protrudes from an associated substrate mounting face 70a in the axial direction of the stator 400.

The width of the substrate mounting face 70a is set to the smallest possible value such that the substrate 90 can be stably mounted on the substrate mounting faces 70a. Thus, the position at which the magnet wire 2 is drawn out of the coil U1 can be shifted close to the side face of the outer wall 71 of the insulator 3. As a result, when the magnet wire 2 is drawn to the outside of the outer wall 71, the position of the magnet wire 2 in a height direction thereof can be lowered. A coil end 20 of the coil U1 is an outermost portion of the coil U1, and part of the coil end 20 that is located on the center line of the tooth 1a is the highest in the coil end 20. The greater the distance between part of the coil end 20 and the center line of the tooth 1a, the lower the height of the part of the coil end 20. Thus, the coil U1 can be more easily drawn from the winding end of the coil U1, thereby improving the manufacturing quality.

The side face of the exit opening portion 11 is aligned with one surface 70b of the octagonal prismatic substrate attachment pin 70 such that a side wall 11b of the exit opening portion 11 gradually outwardly extends toward an inner surface of the outer wall 71. Thus, the side wall 11b serves as a guide for the magnet wire 2 when the magnet wire 2 is guided to the outside of the outer wall 71. In other words, the side wall 11b of the exit opening portion 11 is a surface extending from one side face of the octagonal prismatic substrate attachment pin 70. When drawn from the coil U1 to the outside of the outer wall 71, the magnet wire 2 is drawn out along the side wall 11b. It is therefore possible to reduce the bending angle of the magnet wire 2.

When the exit opening portion 11 is provided closer to a side face 72 of the outer wall 71, the magnet wire 2 can be drawn out from lower part of the coil end 20 of the coil U1, and can thus be easily drawn. Particularly, regarding the magnet wire 2 of the first phase, since the jumper wire 2a between coils is drawn at a position closest to the end face of the stator core 1 on the connection side on which the insulator 3 is provided, the angle at which the magnet wire 2 is drawn can be reduced. Since the magnet wire 2 is drawn out from the low part of the coil end 20, it is easily drawn. Therefore, the manufacturing quality can be improved.

Portions of the magnet wires 2 that connect adjacent coils will be referred to as jumper wires 2a, 2b, and 2c. The jumper wires 2a, 2b, and 2c are drawn over the outer walls 71 of the insulators 3 of the stator core 1 in three regions that are divided with respect to the outer walls 71 in the axial direction. The jumper wire 2a in one of the three areas that is the closest to the end face of the stator core 1 on the connection side connects coils of the first phase. The jumper wire 2b that is second closest to the end face of the stator core 1 on the connection side connects coils of the second phase. The jumper wire that is the farthest from the end face of the stator core 1 on the connection side connects coils of the third phase. The jumper wires 2a, 2b, and 2c of the respective phases are located outward of the outer walls 71 of the connection-side insulators 3b. As illustrated in FIG. 9, etc., the outer walls 71 have protrusions 73 that regulate the positions of the jumper wires 2a, 2b, and 2c to prevent the jumper wires 2a, 2b, and 2c of the respective phases from contacting each other, and to improve a product quality.

After the coil U1 of the first phase is wound, the magnet wire 2 is drawn to the outside of the outer wall 71 of the third tooth 1a, and wound around a first-phase jumper-wire winding pin 12a on the outer wall 71 of the connection-side insulator 3b of the fourth tooth 1a. The first-phase jumper-wire winding pin 12a is provided at a rightmost end portion of the outer wall 71 of the connection-side insulator 3b of the fourth tooth 1a, that is, at an end portion close to the fifth tooth 1a. Since the first-phase jumper-wire winding pin 12a is provided apart from the inner surface of the outer wall 71, the wrapped magnet wire 2 can be prevented from interfering with winding of a coil W2 of the third phase.

After wound around the first-phase jumper-wire winding pin 12a, the jumper wire 2a of the first phase passes through an entrance opening portion 13 formed in the outer wall 71 of the connection-side insulator 3b of the sixth tooth 1a, and is wound around the insulator 3 provided on the tooth 1a, in the counterclockwise direction a predetermined number of times, to thereby form the second coil U2 of the first phase. That is, after wound around the tooth 1a to form a coil, the magnet wire 2 is wound around the first-phase jumper-wire winding pin 12 on the outer wall 71 of a tooth 1a that is adjacent to a tooth 1a around which the coil is wound. Then, the coil of the first phase is formed on a tooth 1a that is the third tooth from the previous coil.

After the coil U2 is wound, the third coil U3 and the fourth coil U4 of the first phase are formed on the ninth tooth 1a and the twelfth tooth 1a, respectively, as well as the coils U1 and U2. After the fourth coil U4 of the first phase is wound, the magnet wire 2 is drawn outwardly from the outer wall 71 through an exit opening portion 15 in the outer wall 71 of the connection-side insulator 3b of the twelfth tooth 1a, thereby completing the winding of the wire of the first phase. After the winding of the wire of the first phase is completed, the magnet wire 2 is wound, without being cut, around the winding pin 12a at an end portion of the outer wall 71 of the connection-side insulator 3b of the eleventh tooth 1a that is close to the twelfth tooth 1a, and then hooked to a right hook of the neutral terminal 5. From the twelfth tooth 1a to the eleventh tooth 1a, the jumper wire 2a extends over a location close to an upper end of the outer wall 71 on the connection side that is distant from the stator core 1, and is thus close to a hook of the neutral terminal 5. Therefore, the magnet wire 2 can be easily hooked to the hook of the neutral terminal 5, and the manufacturing quality can be improved.

Figure 13:
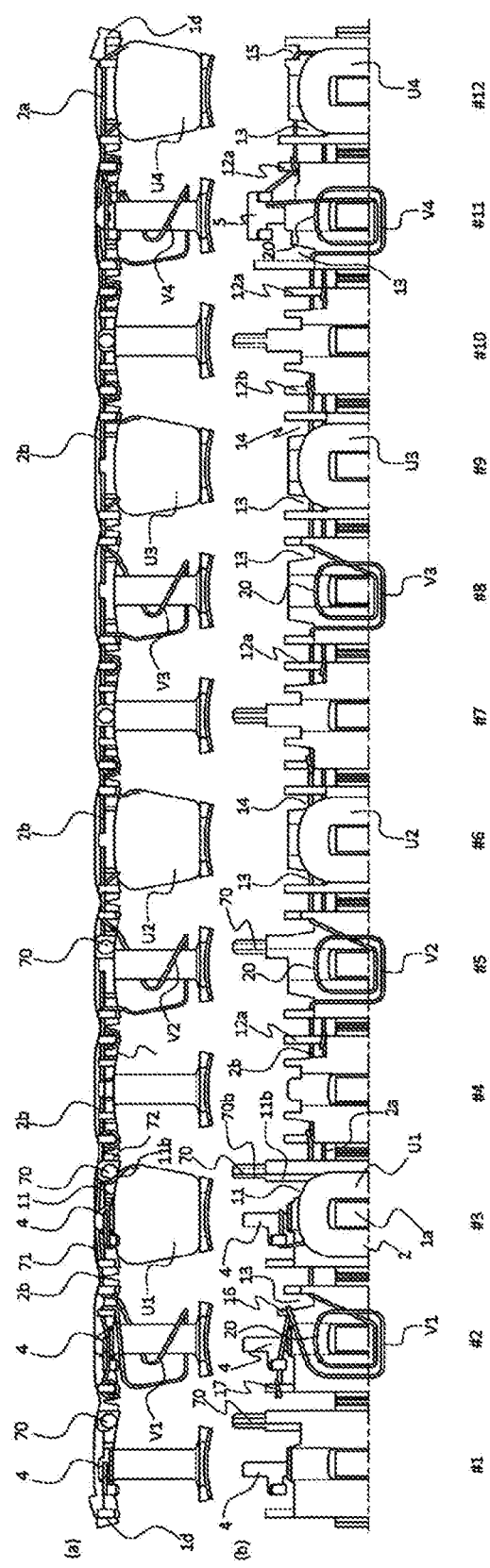
FIG. 13 is a diagram illustrating how a magnet wire of a second phase in the stator of the motor according to Embodiment 1 is routed and wound.

FIG. 13 is a diagram illustrating how the magnet wire of the second phase in the stator 400 of the motor 100 according to Embodiment 1 is routed and wound. The connection of a stator winding of the second phase will be described with reference to FIG. 3.

When the winding of the wire of the first phase is ended, winding of a magnet wire 2 of the second phase that is hooked to the hook of the neutral terminal 5 starts. To be more specific, the magnet wire 2 hooked to the hook of the neutral terminal 5 is wound in the clockwise direction around the eleventh tooth 1a on which the insulator 3 is provided, to thereby form a first coil V4 of the second phase. After the coil V4 is wound, the magnet wire 2 is drawn from the outer wall 71 through an exit opening portion 14 in the connection-side insulator 3b of the outer wall 71 of the insulator 3 of the eleventh tooth 1a. The drawn magnet wire 2 is wound around a winding pin 12b on the outer wall 71 of the connection-side insulator 3b of the tenth tooth 1a that is close to the ninth tooth 1a. The jumper wire 2b wound around the winding pin 12b of the tenth tooth 1a is drawn to the entrance opening portion 13 in the outer wall 71 of the eighth tooth 1a, which is close to the ninth tooth 1a. The magnet wire 2 drawn to the entrance opening portion 13 in the outer wall 71 of the eighth tooth 1a is wound around the ninth tooth 1a on which the insulator 3 is provided, in the clockwise direction a predetermined number of times, to form the second coil V3 of the second phase.

After the coil V3 is wound, the third coil V2 and the fourth coil V1 of the second phase are formed on the fifth tooth 1a and the second tooth 1a, respectively, as well as the coils V4 and V3. After the fourth coil V1 of the second phase is wound, the magnet wire 2 is hooked to a return pin 16 provided at the left of the entrance opening portion 13 in the outer wall 71 of the connection-side insulator 3b of the second tooth 1a, and then hooked to the hook of the power terminal 4. Subsequently, after wound around a winding pin 17 provided at the left of the power terminal 4 in the outer wall 71 of the insulator 3 of the second tooth 1a, the magnet wire 2 is cut and the winding of the second phase for a coil ends.

Figure 14:
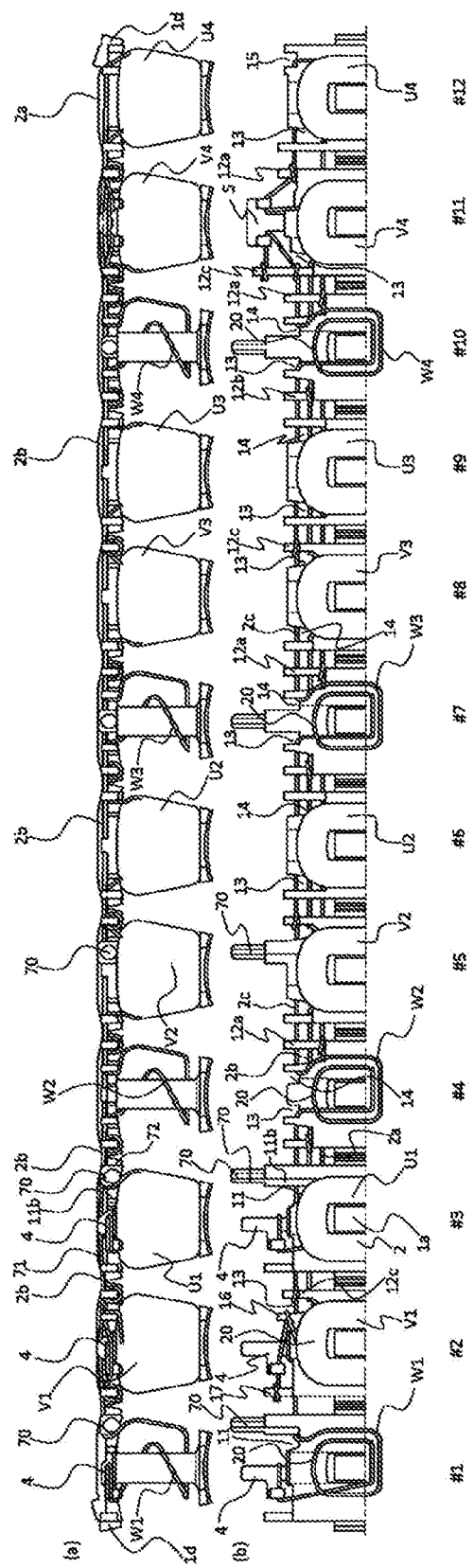
FIG. 14 is a diagram illustrating how a magnet wire of a third phase in the stator of the motor according to Embodiment 1 is routed and wound.

FIG. 14 is a diagram illustrating how the magnet wire of the third phase in the stator 400 of the motor 100 according to Embodiment 1 is routed and wound. The connection of the stator winding of the third phase will be described with reference to FIG. 14.

For winding of the third phase, the first coil W1 is formed on the first tooth 1a coated with the insulator 3. In the same manner as the first coil of the first phase, the first coil W1 of the third phase is formed on the first tooth 1a, and the jumper wire 2c drawn from the outer wall 71 of the connection-side insulator 3b of the first tooth 1a is drawn to a location that is the farthest from the end face of the stator core 1 on the connection side. Therefore, the exit opening portion 11 is formed at a position higher than the exit opening portions 14 of other phases. The magnet wire 2 drawn from the coil W1 to the outside of the outer wall 71 of the connection-side insulator 3b is wound around a winding pin 12c on the outer wall 71 of the connection-side insulator 3b of the second tooth 1a that is close to the third tooth 1a. After wound around the winding pin 12c, the magnet wire 2 is drawn into the tooth 1a through the entrance opening portion 13 in the outer wall 71 of the connection-side insulator 3b of the fourth tooth 1a. The outer wall 71 of the connection-side insulator 3b of the tooth 1a on which the coil of the third phase is formed includes the winding pins 12a of the other phases at end portions close to the teeth 1a on both sides. Opening portions are formed immediately adjacent to the respective winding pins 12a. The entrance opening portions 13s and the exit opening portions 14 provided separate from the above opening portions are each formed close to the center of an associated tooth 1a. The entrance opening portion 13 and the exit opening portion 14 of the third phase are configured such that the jumper wire 2c is drawn to a position higher than the entrance opening portions 13 and the exit opening portions 14 formed in the outer walls 71 of the teeth 1a on which coils of the other phases are formed. That is, lower ends of the entrance opening portions 13 and exit opening portions 11 and 14 where the coils W1 to W4 of the third phase are formed are formed at positions higher than the entrance opening portions 13 and exit opening portions 11 and 14 formed in the outer walls 71 of the teeth 1a where the coils U1 to U4 of the first phase and the coils V1 to V4 of the second phase are formed.

The second coil W2 of the third phase is formed such that it is wound in the counterclockwise direction around the fourth tooth 1a, as well as the first coil W1. After the second coil W2 is formed, the magnet wire 2 is drawn to the outside of the outer wall 71 through the exit opening portion 14 on the connection side of the outer wall 71 of the connection-side insulator 3b of the fourth tooth 1a. The third coil W3 and the fourth coil W4 of the third phase are formed on the seventh tooth 1a and the tenth tooth 1a, respectively, in the same manner as the second coil W2 of the third phase.

After the fourth coil W4 of the third phase is formed, the magnet wire 2 is drawn to the outside of the outer wall 71 through the exit opening portion 14 in the outer wall 71 of the connection-side insulator 3b of the tenth tooth 1a, and wound around a winding pin 12c of the eleventh tooth 1a. The winding pin 12c of the eleventh tooth 1a is provided at part of the outer wall 71 of the connection-side insulator 3b of the eleventh tooth 1a that is the closest to the tenth tooth 1a. The magnet wire 2 wound around the winding pin 12c is hooked to the hook of the neutral terminal 5. The magnet wire 2 hooked to the hook of the neutral terminal 5 is then wound around upper part of the winding pin 12c and cut at an end of the magnet wire 2, thereby completing the winding of the third phase.

After completion of winding, the stator 400 is bent toward distal end portions of the teeth 1a into a round shape, and welded at the stator-core butt portions 1d. Furthermore, the hooks of the power terminals 4 to which the magnet wire 2 is hooked are joined to the magnet wire 2 by fusing or soldering, thereby completing formation of the stator 400.

Figure 15:
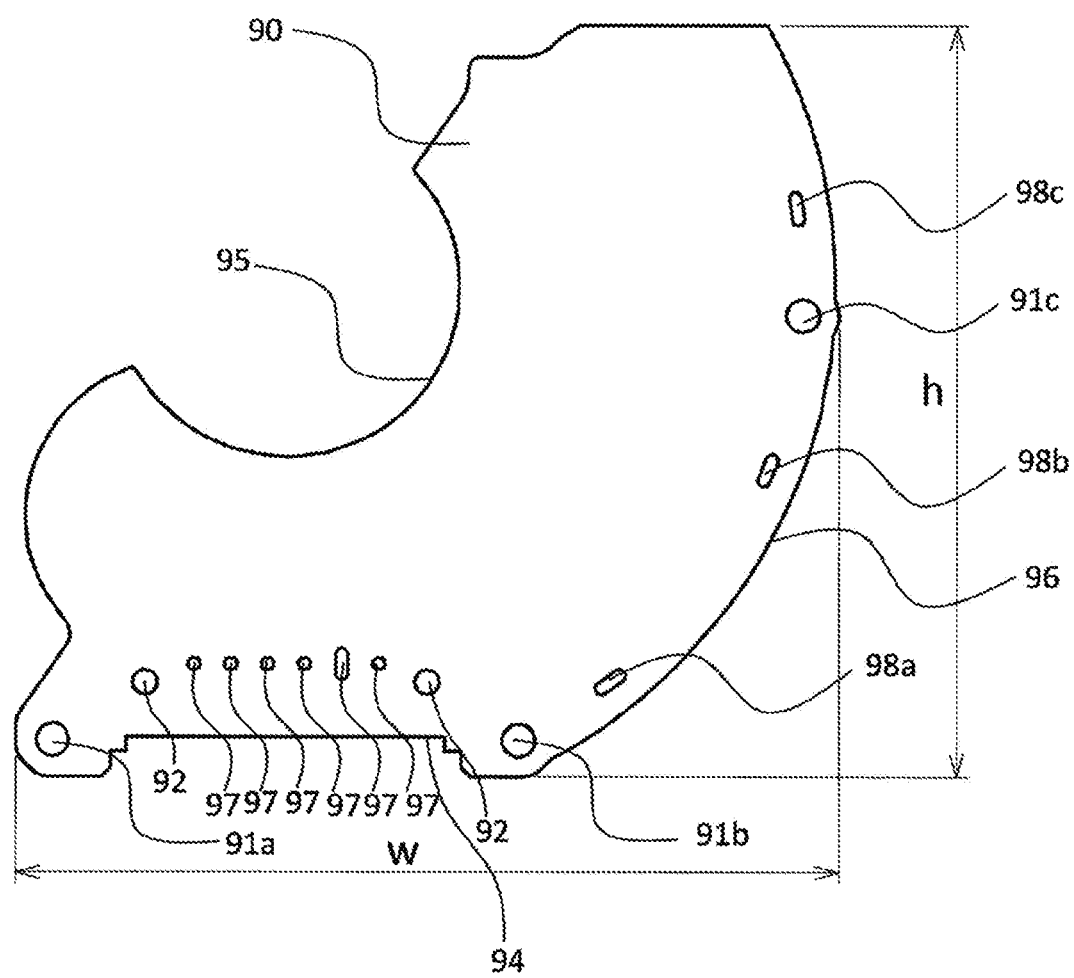
FIG. 15 is a plan view illustrating only the substrate of the stator assembly as illustrated in FIG. 7.
Figure 16:
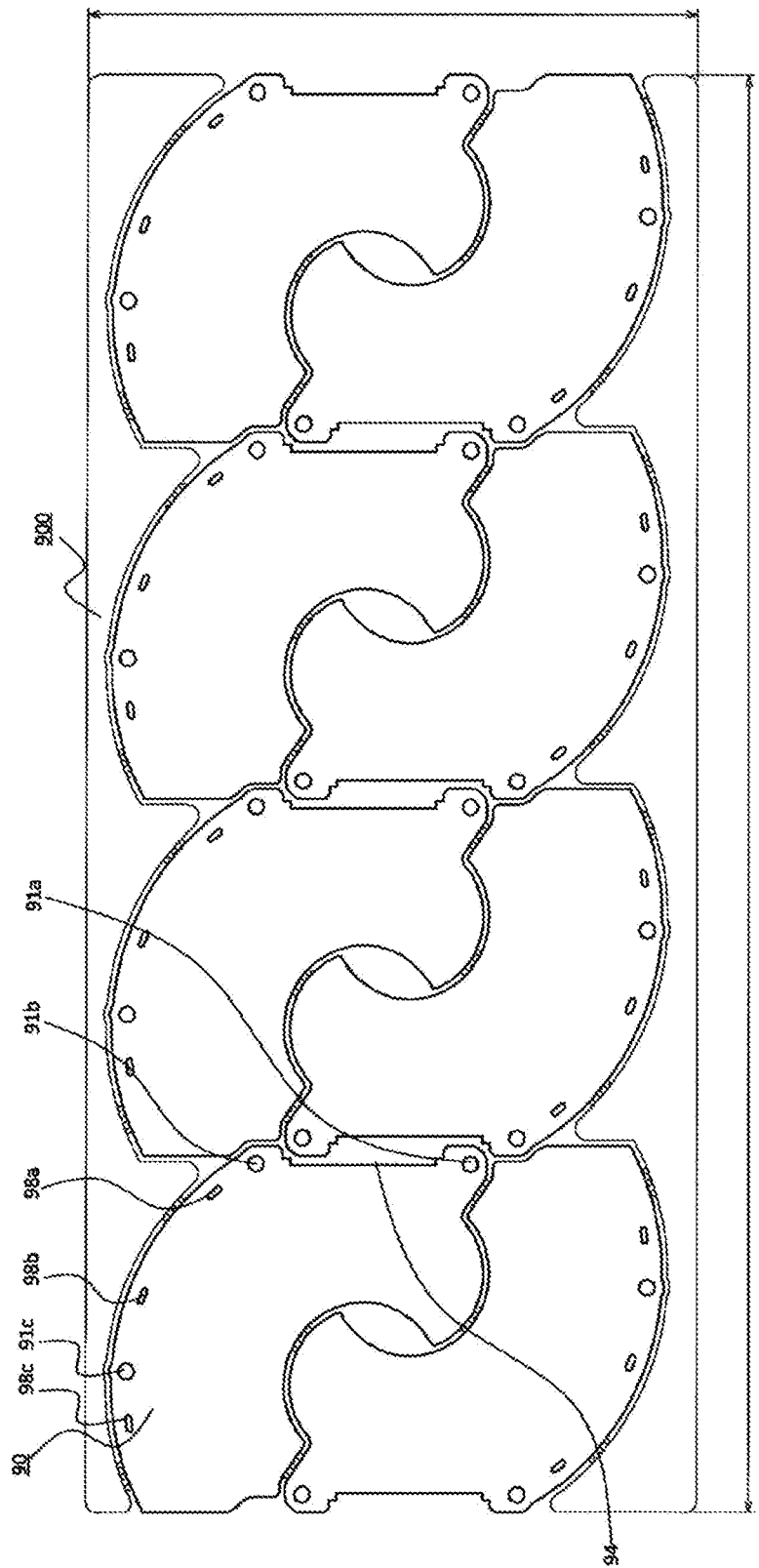
FIG. 16 is a plan view of substrates that have not yet been cut out of a plate material.

FIG. 15 is a plan view illustrating only the substrate 90 of the stator assembly 300 as illustrated in FIG. 7. FIG. 16 is a plan view of substrates 90 that have not yet been cut out of a plate material 900.

Substrates 90 on each of which a driving circuit of the motor 100 is mounted are arranged in a plate material 900 that is cut out to have predetermined dimensions, such that the largest possible number of substrates 90 can be cut out from the plate material 900. Since the largest possible number of substrates 90 can be cut out from the plate material 900, the cost of the substrates can be minimized. Since the width w and the height h of each substrate 90 can be reduced, it is possible to increase the number of substrates 90 that can be cut out from a predetermined plate material 900. Thus, it is important that the terminal holes 98 and the stator mounting holes 91 arranged along the outer periphery of the substrate 90 are provided within the smallest possible area in the circumferential direction. Of the three stator mounting holes 91 and the three terminal holes 98 arranged along the outer periphery of the substrate 90, a hole located at one end of the substrate 90 is a stator mounting hole 91a. Because of this configuration, the lead leading component 80 for the leads 61 can be provided between the stator mounting hole 91a and a stator mounting hole 91b. Furthermore, of the three stator mounting holes 91 and the three terminal holes 98 arranged along the outer periphery of the substrate 90, a hole located at the other end of the substrate 90 is a terminal hole 98c. The terminal hole 98a and the stator mounting hole 91b are arranged as close as possible to each other, a stator mounting hole 91c is provided as close as possible to an inner side of the substrate 90, and two stator mounting holes 91a and 91b between which the lead leading component 80 is provided are arranged as close as possible to each other. Because of this configuration, the size of each substrate 90 can be reduced.

To reduce the size of each substrate 90 as described above, the stator 400 includes substrate attachment pins 70 on the right side of the power terminal 4 in the outer wall 71 of the connection-side insulator 3b of the first tooth 1a and also on the right side of the power terminal 4 in the outer wall 71 of the connection-side insulator 3b of the third tooth 1a. The substrate attachment pins 70 are each disposed as close as possible to the inner periphery of the outer wall 71 of the connection-side insulator 3b. The substrate attachment pin 70 on the outer wall 71 of the connection-side insulator 3b of the fifth tooth 1a is provided as close as possible to the fourth tooth 1a and also as close as possible to the inner periphery of the outer wall 71. Because of this configuration, the lead leading component 80 can be attached to the substrate 90, and at the same time, the substrate attachment pins 70 are provided within the smallest possible range, whereby the outer dimensions of the substrate 90 can be reduced.

In order that the substrate 90 be stably attached to the stator 400, the substrate 90 is secured to the stator 400 at three points, thus improving the product quality. The substrate 90 has the stator mounting holes 91a, 91b, and 91c into which the stator 400 is fitted, the terminal holes 98a, 98b, and 98c into which the power terminals 4 are fitted, the lead-leading-component mounting holes 92, lead terminal holes 97, and a notch 94 in which the lead leading component 80 is fitted. Furthermore, as seen in plan view, the edge portion 95 on the inner peripheral side of the substrate 90 that is formed in the shape of a divided disc is formed in the shape of an arc that is concentric with the arc of the edge portion 96 on the outer peripheral side of the substrate 90 having the terminal hole 98c and the stator mounting hole 91c, and is smaller in radius than that on the outer peripheral side. The arc of the edge portion 95 of the substrate 90 on the inner peripheral side of the substrate 90 is 180 degrees or more. Because of this configuration, for example, when the substrate 90 is automatically conveyed at the time of manufacturing the substrate 90, the substrate 90 is held such that the inner periphery of the substrate 90 is pulled outwardly in the radial direction. Thus, the substrate 90 can be stably held, and the manufacturing quality is improved.

The lead leading component 80 is fitted in the notch 94 of the substrate 90, an engaging portion 83 is engaged with the substrate 90, and mounting feet 81 of the lead leading component 80 are engaged with the lead-leading-component mounting holes 92. In this case, the terminals of the leads 61 of the lead leading component 80 are inserted into the lead terminal holes 97, and in addition, the substrate 90 and the lead terminals are joined by soldering. As illustrated in FIG. 7, the substrate 90 on which the lead leading component 80 is mounted is attached to the stator 400. The substrate 90 attached to the stator 400 is attached by performing thermal or ultrasonic welding on the substrate attachment pins 70 of the stator 400 that protrude from the substrate 90. By further applying solder to the power terminals 4 protruding from the terminal holes 98 in the substrate 90, the stator 400 to which the substrate 90 is attached is obtained.

The stator 400 to which the substrate 90 is attached is placed in dies, and molded out of a thermosetting resin such as a bulk molding compound (BMC, e.g., unsaturated polyester), thereby obtaining the mold stator 200. In this case, when the stator 400 to which the substrate 90 is attached is placed in the dies, a plurality of raised portions that contact the dies are formed at the outer walls 71 of the anti-connection-side insulators 3c. These raised portions serve as die holding members 3a as illustrated in FIG. 4. Furthermore, raised portions of the outer walls of the connection-side insulators 3b are pushed against a plurality of retaining pins of the dies and also serve as the die holding members 3a as illustrated in FIG. 4. The dies include a plurality of retaining pins that prevent the substrate 90 from floating toward the outer shell of the mold stator 200. The dies also have a substrate supporting portion that prevents the substrate 90 from sinking toward the interior of the mold stator 200, that is, toward the stator 400. Because of this configuration, the substrate 90 and the stator 400 can be provided at predetermined positions without being affected by resin pressure during molding of the mold stator 200, and the manufacturing quality is thus improved. The retaining pins of the outer one of the dies appear as recesses 215 in the mold stator 200, and the substrate mounting portion of an inner one of the dies appears as the U-shaped portion 214 of the mold stator 200.

Figure 17:
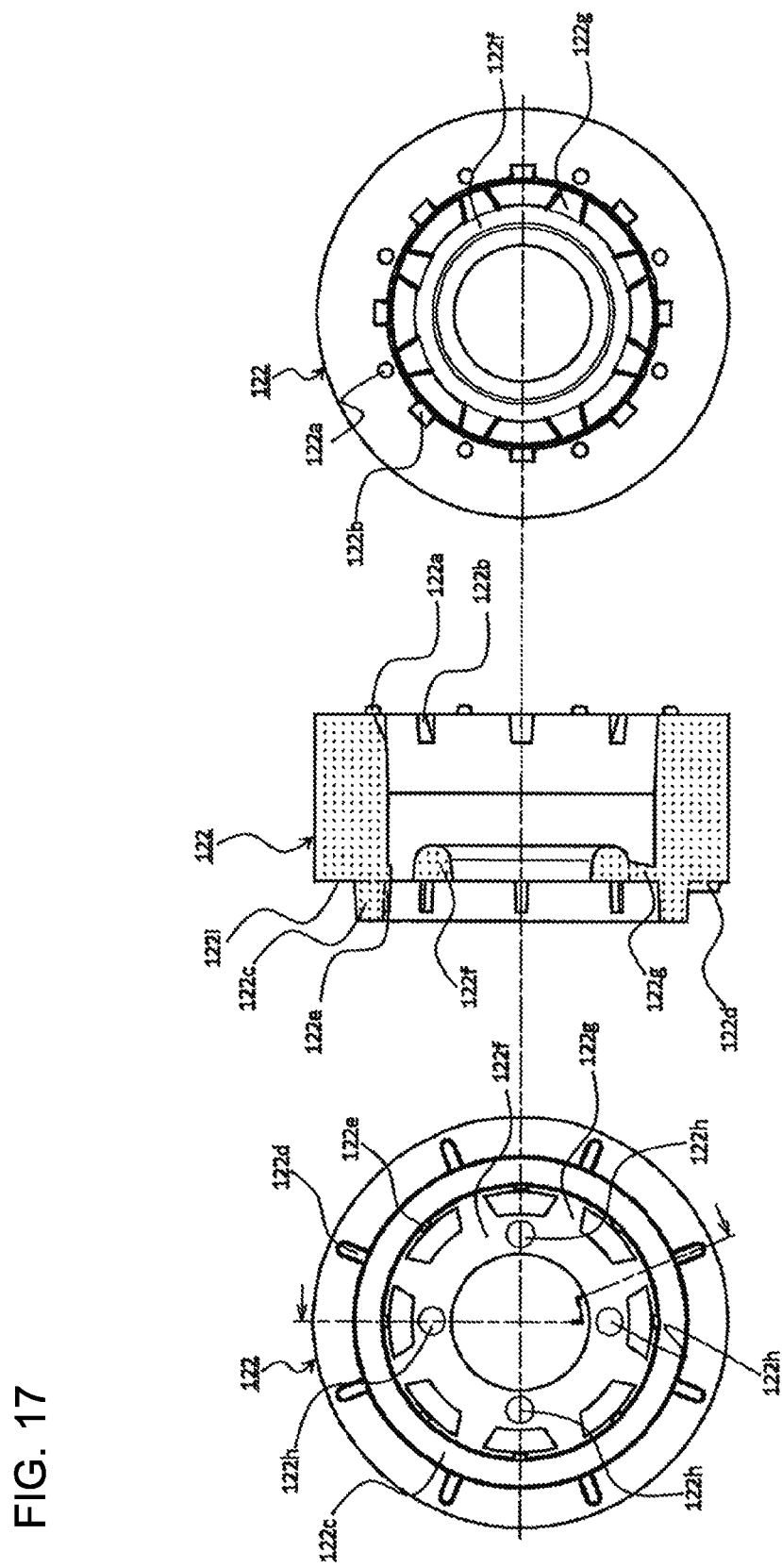
FIG. 17 is an explanatory diagram illustrating a structure of a rotor magnet of the rotor of Embodiment 1 that is obtained immediately after molding.
Figure 18:
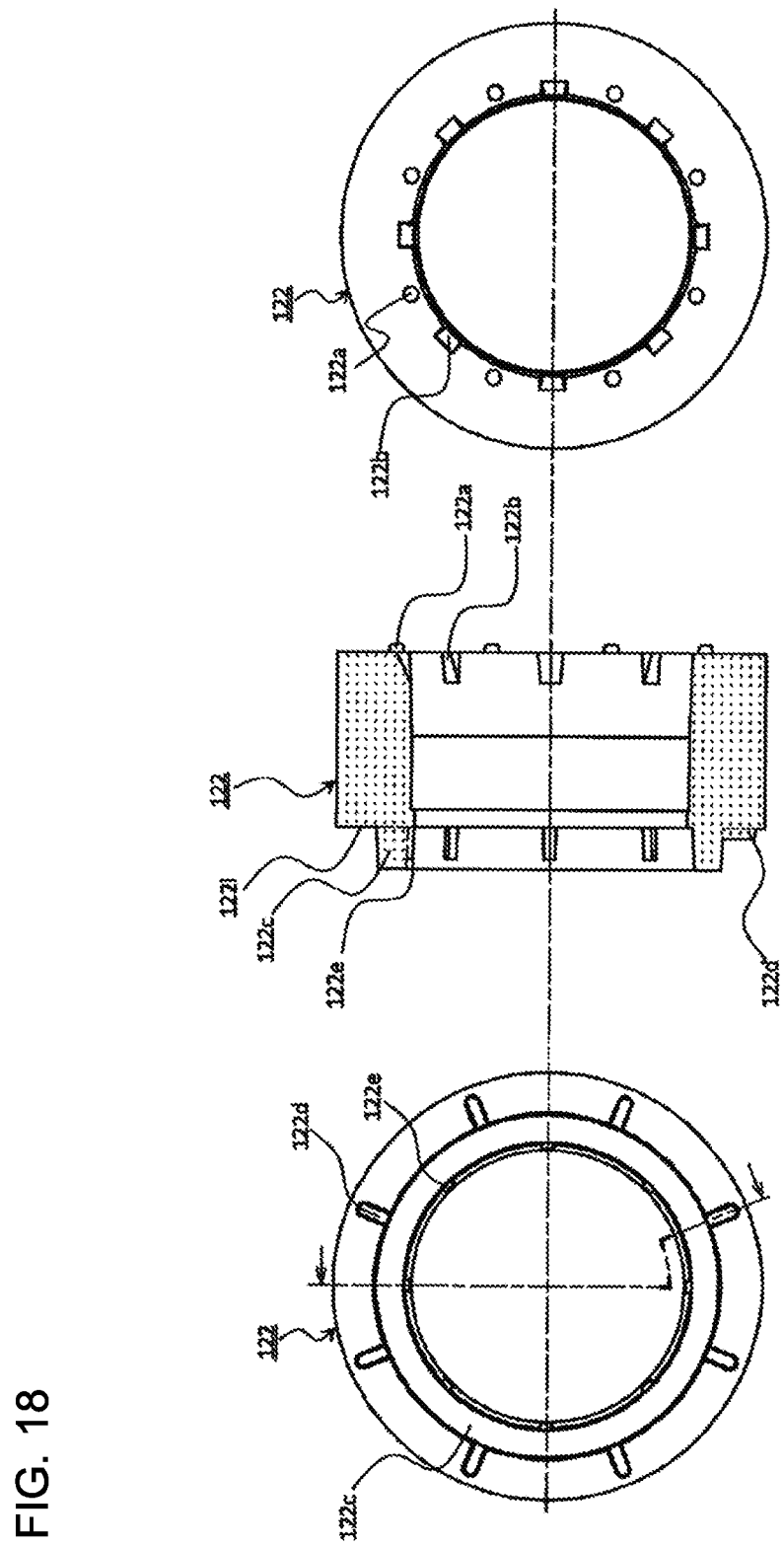
FIG. 18 is an explanatory diagram illustrating a structure obtained by removing runners from the rotor magnet as illustrated in FIG. 17.

FIG. 17 is an explanatory diagram illustrating a structure of the rotor magnet 122 of the rotor 120 of Embodiment 1 that is obtained immediately after molding. FIG. 18 is an explanatory diagram illustrating a structure obtained by removing runners from the rotor magnet 122 as illustrated in FIG. 17. The rotor magnet 122 is obtained by molding a plastic magnet, and has a cylindrical shape. One end face of the rotor magnet 122 in the axial direction has a plurality of protrusions 122a that protrude outwardly from the end face in the axial direction and transmit torque when the rotor magnet 122 is molded integrally with the shaft 123, and also has notches 122b tapered inwardly and each located between associated adjacent ones of the protrusions 122a. At the other end face of the rotor magnet 122, a sensor detection portion 122c is provided, and is to be detected by a rotation detection sensor mounted on the substrate 90. The sensor detection portion 122c is a portion that is raised in the axial direction at the inner periphery of the other end face of the rotor magnet 122 to form a stepped portion. Furthermore, raised portions 122d are formed to extend from the sensor detection portion 122c toward the outer periphery, and are arranged at regular intervals in the circumferential direction. To be more specific, the raised portions 122d each extend from the outer periphery of the sensor detection portion 122c to a position close to the outer periphery of the rotor magnet 122. The raised portions 122d are used for phasing during resin molding when the shaft 123 and the rotor magnet 122 are integrally molded out of thermoplastic resin.

At an inner peripheral surface of the sensor detection portion 122c, protruding portions 122e are formed. The protruding portion 122e transmit torque from the rotor magnet 122 to the shaft 123 when the shaft 123 and the rotor magnet 122 are integrally molded out of thermoplastic resin. An end portion of each protruding portion 122e in the axial direction of the rotor magnet 122 is located apart from the end face of the sensor detection portion 122c by a predetermined distance. Because of this configuration, the rotor magnet 122 and the shaft 123 do not fall off each other in the axial direction.

During molding of the rotor magnet 122, a ring-shaped ring runner 122f provided inward of the inner periphery thereof and radial runners 122g radially extending from the ring runner 122f are connected to the inner periphery of the rotor magnet 122. The ring runner 122f and the radial runners 122g serve as passages for injecting a plastic magnet into a main body of the rotor magnet 122. An end face of the ring runner 122f that is close to the sensor detection portion in the axial direction is a flat surface having gate ports 122h. The gate ports 122h are arranged at four positions and at regular intervals in the circumferential direction. Since the rotor magnet 122 has eight poles, two radial runners 122g are arranged for each of the gate ports 122h in order that the plastic magnet be evenly injected into the main body of the rotor magnet 122. The end face of the ring runner 122f that is close to the sensor detection portion 122c is aligned with an end face 122i of the rotor magnet 122. Thus, the radial runners 122g are not directly connected to the sensor detection portion 122c, thereby reducing a pressure loss in the flow of plastic magnet during molding, and improving moldability. Therefore, the manufacturing quality is improved. It should be noted that since the rotor magnet 122 is primarily shaped by a stationary die for use in molding of the rotor magnet 122, it is possible to prevent the molded magnet from sticking to a movable die, and thus to improve the manufacturing quality.

The rotor magnet 122 is demagnetized after being molded. Then, the radial runners 122g are each cut off at a position close to the inner periphery of the rotor magnet 122, and the ring runner 122f is also cut off from the main body of the rotor magnet 122 to obtain the rotor magnet 122. It should be noted that the radial runners 122g and the ring runner 122f are broken, and these broken runners are applied to molding of the rotor magnet 122, thereby reducing the cost of the motor 100.

The rotor 120 of the motor 100 is obtained by integrally molding the rotor magnet 122 and the shaft 123 out of thermoplastic resin such as PBT. Part of the shaft 123 that has a predetermined length from one end face of the shaft 123 has a smaller diameter. For example, by fitting onto the above part of the shaft 123, a ring-shaped insulating component molded out of thermosetting resin having a coefficient of linear expansion that is close to the coefficient of linear expansion of iron, the bearings 121a and 121b can be electrically insulated from the shaft 123. In addition, because of this configuration, it is possible to prevent electrolytic corrosion of the bearings 121a and 121b, and thus improve the product quality.

The rotor 120 is molded by inserting into a die, the rotor magnet 122 and the shaft 123 onto which the insulating component is fitted. When the rotor magnet 122 is inserted into the die, the rotor magnet 122 in the circumferential direction is positioned by fitting the raised portions 122d on the end face of the rotor magnet 122 into the die. When closed, the die is fitted into the tapered notches 122b in the end face of the rotor magnet 122 that is located on the opposite side of the end face having the raised portions 122d. The tapered notches 122b of the rotor magnet 122 and the die that is fitted into the tapered notches 122b are made such that the outer periphery of the rotor magnet 122 and the part of the die in which the outer periphery of the rotor magnet 122 is fitted. The rotor 120 is made such that the central axis of part of a die that positions the rotor magnet 122 by setting the outer periphery of the rotor magnet 122 at the part of the die is aligned with the central axis of part of a die that forms the tapered notches 122b of the rotor magnet 122. Thus, the center axis of the rotor magnet 122 can be aligned with that of the shaft 12, and the product quality of the rotor 120 can thus be improved.

As illustrated in FIG. 6, in the rotor 120 integrally formed out of thermoplastic resin, the cylindrical portion 124g formed on the outer periphery of the shaft 123 and the cylindrical portion 124a formed on the inner periphery of the rotor magnet 122 are connected by a plurality of ribs 124b and are thus provided as a single body. In Embodiment 1, the rotor 120 has eight poles and the number of the ribs is set to four. At the cylindrical portion 124g on the outer periphery of the shaft, resin injection portions 124d are provided in such a manner as to protrude outwardly in the radial direction. The resin injection portions 124d are each located at the center of a region between associated adjacent ones of the ribs 124b in the circumferential direction. After injected into the resin injection portions 124d, the thermoplastic resin is first formed into the cylindrical portion 124g on the outer periphery of the shaft, and passes through the ribs 124b to reach the cylindrical portion 124a on the inner periphery of the rotor magnet 122. Since the resin is first injected into the cylindrical portion 124g on the outer periphery of the shaft, a heat shock resistance of the rotor 120 is improved, and the product quality is thus improved.

In the cylindrical portion 124a joined to the rotor magnet 122, welds are each formed in the axial direction at substantially the center of the region between associated adjacent ones of the ribs 124b. If air in the die does not escape through the welds, burns occur and cause defects in a product. However, in Embodiment 1, ejector pins 124c on the end face of the sensor detection portion 122c of the rotor magnet 122 (that are pins for pushing the product from the die after molding) are each provided at the center of the region between the associated adjacent ones of the ribs 124b such that the outside periphery of each of the ejector pins contacts the end face of the cylindrical portion 124a on the inner peripheral side of the rotor magnet. Furthermore, in an end face of the cylindrical portion 124a that is located on the opposite side of the end face contacting the ejector pins, the notches 122b in which the die is fitted are present. Because of this configuration, it is possible to cause air in the die to escape, and improve the manufacturing quality. It should be noted that half of the eight notches 122b of the rotor magnet 122 that are arranged in the circumferential direction are filled with resin during molding of the rotor 120, and serve to transmit a rotary torque from the rotor magnet 122 to the shaft 123.

The motor 100 of Embodiment 1 is obtained, as illustrated in FIG. 1, by setting the rotor 120 including the bearings 121a and 121b mounted thereon, at the mold stator 200, setting a spring washer (not illustrated) between the bearing 121 and the bracket 130, and press-fitting the bracket 130 into the mold stator 200.

Figure 19:
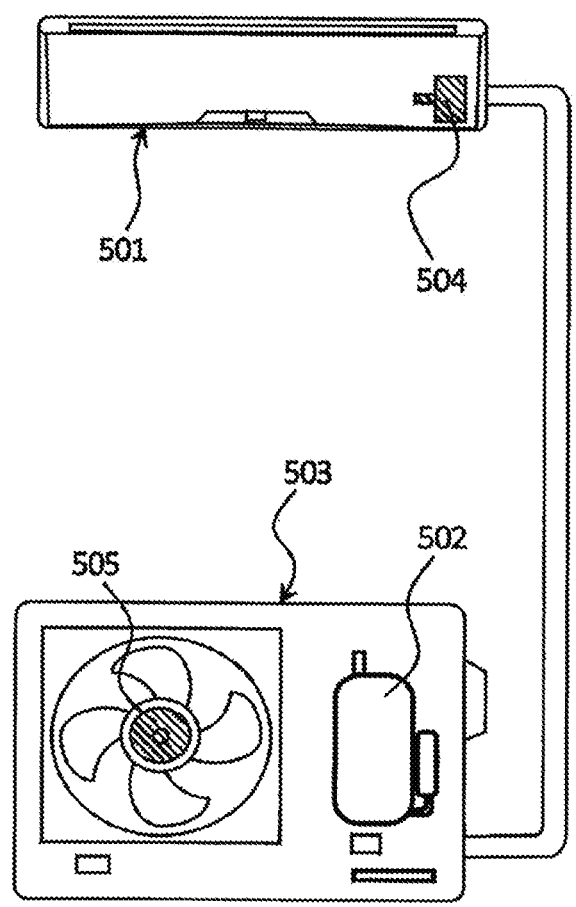
FIG. 19 is a schematic diagram of an air-conditioning apparatus including the motor according to Embodiment 1.

FIG. 19 is a schematic diagram of an air-conditioning apparatus 500 including the motor 100 according to Embodiment 1. The air-conditioning apparatus 500 is formed by connecting an indoor unit 501 and an outdoor unit 502. For example, the indoor unit 501 includes a fan 504 that is driven by the motor 100 of Embodiment 1, and the outdoor unit 502 includes a fan 505 that is driven by the motor 100 of Embodiment 1. The quality of the air-conditioning apparatus 500 is improved by mounting, as part of the fans 504 and 505 that are major components of an air-conditioning apparatus, a motor having a high quality and formed at a low cost, such as the motor 100 of Embodiment 1, in the air-conditioning apparatus 500.

REFERENCE SIGNS LIST stator core, 1a tooth, 1a-1 end portion, 1b core back, 1c thin connecting portion, 1d stator-core butt portion, 2 magnet wire, 2a jumper wire, 2b jumper wire, 2c jumper wire, 3 insulator, 3a die holding member, 3b connection-side insulator, 3c anti-connection-side insulator, 4 power terminal, 5 neutral terminal, 8 protrusion, 11 exit opening portion, 11b side wall, 12 pin, 12a pin, 12b pin, 12c pin, 13 entrance opening portion, 14 exit opening portion, 15 exit opening portion, 16 return pin, 17 pin, 20 coil end, 61 lead, 70 substrate attachment pin, 70a substrate mounting face, 70b surface, outer wall, 72 side face, 73 protrusion, 80 lead leading component, 81 mounting foot, 83 engaging portion, 90 substrate, 91 stator mounting hole, 91a stator mounting hole, 91b stator mounting hole, 91c stator mounting hole, 92 lead-leading-component mounting hole, 93 arc, 94 notch, 95 edge portion, 96 edge portion, 97 lead terminal hole, 98 terminal hole, 98a terminal hole, 98b terminal hole, 98c terminal hole, 100 motor, 120 rotor, 120-1 rotor resin assembly, 121 bearing, 121a load-side rolling bearing, 121b anti-load-side rolling bearing, 122 rotor magnet, 122a protrusion, 122b notch, 122c sensor detection portion, 122d raised portion, 122e protruding portion, 122f ring runner, 122g radial runner, 122h gate port, 122i end face, 123 shaft, 123a knurled portion, 124 resin portion, 124a cylindrical portion, 124b rib, 124c resin injection portion, 124g cylindrical portion, 124j rib, 124k hollow portion, 130 bracket, 200 mold stator, 211 hole, 212 cavity, 214 U-shaped portion, 215 recess, 250 molding resin, 300 stator assembly, 400 stator, 500 air-conditioning apparatus, 501 indoor unit, 502 outdoor unit, 505 fan, 900 plate material, U1 coil, U2 coil, U3 coil, U4 coil, V1 coil, V2 coil, V3 coil, V4 coil, W1 coil, W2 coil, W3 coil, W4 coil, Y single, h height, w width

The invention claimed is:
1. A motor comprising a stator where a substrate on which electronic components are mounted is provided, the substrate being located at an end portion of the stator in an axial direction of the stator,
wherein the stator includes
a stator core formed by stacking electromagnetic steel sheets, and including a plurality of teeth,
insulators provided on the stator core, and
a wire wound around the teeth, the teeth being coated with the insulators,
wherein the insulators with which the teeth are coated have outer walls provided on respective core backs of the stator core, and wherein in a linearly developed state of the stator, where an outermost one of the teeth is a first tooth, one of the teeth that is adjacent to the first tooth is a second tooth, another one of the teeth that is adjacent to the second tooth is a third tooth, another one of the teeth that is adjacent to the third tooth is a fourth tooth, and another one of the teeth that is adjacent to the fourth tooth is a fifth tooth, the outer walls of the first tooth, the third tooth, and the fifth tooth include respective substrate attachment pins for use in attachment of the substrate, and the outer walls of each of the first tooth and the third tooth include one of three respective power terminals for use in supplying power to the wire, wherein each of the first tooth and third tooth include both one of the respective substrate attachment pins and one of the respective power terminals.

2. The motor of claim 1, wherein each of the outer walls has an opening portion for use in drawing the wire from outside of the outer wall to inside thereof or from the inside of the outer wall to the outside thereof, the wire being wound around the teeth to form coils.

3. The motor of claim 2, wherein in the outer walls of the teeth that include the power terminals, the opening portions are provided closer to respective centers of the teeth than the substrate attachment pins.

4. The motor of claim 3, wherein in the outer walls of the teeth that include the power terminals, side surfaces of the opening portions that extend in the axial direction of the stator are formed such that the opening portions gradually expand toward inner sides of the outer walls.

5. The motor of claim 2, wherein in the outer walls of ones of the tooth that include no power terminal, the substrate attachment pins are provided closer to respective centers of the tooth than the opening portions.

6. The motor of claim 1, wherein the substrate attachment pins are octagonal prisms.

7. An air-conditioning apparatus comprising the motor of claim 1.

* * * * *